(12) United States Patent
Seo et al.

(10) Patent No.: US 12,186,760 B2
(45) Date of Patent: Jan. 7, 2025

(54) FOOD WASTE DISPOSER

(71) Applicant: Samsung Electronics Co., Ltd., Suwon-si (KR)

(72) Inventors: Wonyoung Seo, Suwon-si (KR); Keonpyo Koo, Suwon-si (KR); Daegeon Kim, Suwon-si (KR); Namsoo Park, Suwon-si (KR); Kyoungmok Kim, Suwon-si (KR); Jiho Seo, Suwon-si (KR); Donghyun Chun, Suwon-si (KR); Yongjun Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 17/662,025

(22) Filed: May 4, 2022

(65) Prior Publication Data
US 2023/0001423 A1 Jan. 5, 2023

Related U.S. Application Data

(63) Continuation of application No. PCT/KR2022/005427, filed on Apr. 14, 2022.

(30) Foreign Application Priority Data

Jul. 5, 2021 (KR) .................. 10-2021-0087915
Aug. 17, 2021 (KR) .................. 10-2021-0108107
Jan. 21, 2022 (KR) .................. 10-2022-0009436

(51) Int. Cl.
B02C 18/00 (2006.01)
B02C 18/22 (2006.01)

(52) U.S. Cl.
CPC ...... B02C 18/2216 (2013.01); B02C 18/0084 (2013.01); B02C 18/0092 (2013.01); *B02C 2201/06* (2013.01)

(58) Field of Classification Search
CPC ........... B02C 18/0092; B02C 18/0084; B02C 18/2216; B02C 23/36
See application file for complete search history.

(56) References Cited

U.S. PATENT DOCUMENTS 7,527,061 B2   5/2009  Kim et al.
2020/0018053 A1  1/2020  Nickolov
(Continued)

FOREIGN PATENT DOCUMENTS

JP       2004-167469 A    6/2004
KR    20-1996-0010343 Y1  12/1996
(Continued)

OTHER PUBLICATIONS

International Search Report and Written Opinion of the International Searching Authority dated Nov. 3, 2022, in connection with International Application No. PCT/KR2022/010209, 13 pages.
(Continued)

*Primary Examiner* — Faye Francis

(57) ABSTRACT

Provided is a food waste disposer. The food waste disposer according to a concept of the disclosure includes: a housing; a grinding device positioned inside the housing and configured to grind food waste; and a storage device positioned below the grinding device and storing the grinded food waste, wherein the grinding device includes: a grinding case configured to grind the food waste, and including an outlet opening to transfer the food waste to the storage device; and a valve assembly positioned below the grinding case and opening and closing the outlet, the valve assembly being separable from the housing together with the grinding case.

20 Claims, 29 Drawing Sheets

(56) References Cited

U.S. PATENT DOCUMENTS

2021/0213497 A1* 7/2021 Naik .................. C05F 9/02
2021/0379598 A1* 12/2021 Chen ............... B02C 18/0092
2022/0001389 A1* 1/2022 Maxwell ............... B02C 18/12

FOREIGN PATENT DOCUMENTS

| KR | 0179418 B1 * | 3/1999 | ......... B02C 18/0092 |
| --- | --- | --- | --- |
| KR | 10-2000-0007831 A | 2/2000 | |
| KR | 10-2006-0032469 A | 4/2006 | |
| KR | 10-2008-0007981 A | 1/2008 | |
| KR | 10-2009-0041801 A | 4/2009 | |
| KR | 10-2010-0008058 A | 1/2010 | |
| KR | 20-2010-0003932 U | 4/2010 | |
| KR | 10-2010-0064769 A | 6/2010 | |
| KR | 10-1017616 B1 | 2/2011 | |
| KR | 10-2012-0048098 A | 5/2012 | |
| KR | 101178784 B1 * | 9/2012 | ......... B02C 18/0084 |
| KR | 10-2014-0091773 A | 7/2014 | |
| KR | 10-1424187 B1 | 7/2014 | |
| KR | 10-2015-0007845 A | 1/2015 | |
| KR | 10-2015-0071903 A | 6/2015 | |
| KR | 10-1571034 B1 | 11/2015 | |
| KR | 10-1682100 B1 | 12/2016 | |
| KR | 10-2017-0035541 A | 3/2017 | |
| KR | 10-2017-0117711 A | 10/2017 | |
| KR | 10-2019-0096629 A | 8/2019 | |
| KR | 10-2020-0040573 A | 4/2020 | |
| KR | 10-2020-0041050 A | 4/2020 | |
| KR | 10-2020-0082905 A | 7/2020 | |

OTHER PUBLICATIONS

International Search Report dated Aug. 4, 2022 in connection with International Patent Application No. PCT/KR2022/005427, 4 pages.
Written Opinion dated Aug. 4, 2022 in connection with International Patent Application No. PCT/KR2022/005427, 4 pages.

* cited by examiner

FOOD WASTE DISPOSER

CROSS-REFERENCE TO RELATED APPLICATIONS

This application is a Bypass Continuation of International Application No. PCT/KR2022/005427, filed Apr. 14, 2022, which claims priority to Korean Patent Applications No. 10-2021-0087915, filed on Jul. 5, 2021, No. 10-2021-0108107, filed on Aug. 17, 2021, and No. 10-2022-0009436, filed on Jan. 21, 2022 in the Korean Intellectual Property Office, the disclosures of which are incorporated by reference herein in their entireties.

BACKGROUND

1. Field

The disclosure relates to a food waste disposer, and more particularly, to a food waste disposer with an improved structure.

2. Description of the Related Art

In general, a food waste disposer is an apparatus for processing food waste by drying, stirring, and grinding the food waste. The food waste disposer includes a grinding device for stirring and grinding food waste. Also, the food waste disposer includes a heater for applying heat to the grinding device to dry food waste contained in the grinding device.

The grinding device includes a grinding case used as a container in which food waste is stored, and a grinder which is rotatable inside the grinding case.

However, it may be inconvenient for users to dispose of food waste grinded in a grinding case.

Also, there may be a case in which, even when a storage container is provided separately from a grinding device, the grinding device cannot be washed separately from the storage container due to a coupling structure of the storage container and the grinding device.

SUMMARY

Therefore, it is an aspect of the disclosure to provide a food waste disposer having a grinding device which is separable from a housing.

It is another aspect of the disclosure to provide a food waste disposer having a grinding device that is separable from a housing in a case in which an outlet of the grinding device is closed.

Additional aspects of the disclosure are set forth in part in the description which follows and, in part, are to be understood from the description, or may be learned by practice of the disclosure.

A food waste disposer according to a concept of the disclosure includes: a housing; a grinding device positioned inside the housing and configured to grind food waste; and a storage device positioned below the grinding device and storing the grinded food waste, wherein the grinding device includes: a grinding case configured to grind the food waste, and including an outlet opening to transfer the food waste to the storage device; and a valve assembly positioned below the grinding case and opening and closing the outlet, the valve assembly being separable from the housing together with the grinding case.

The valve assembly may include: a valve accommodating case protruding downward from the grinding case; and a valve member rotatably provided inside the valve accommodating case and opening and closing the outlet.

The valve member may include: a body; and a communicating portion provided inside the body and opening the outlet of the grinding case.

The food waste disposer may further include: a first driver configured to provide power to a rotating grinder installed inside the grinding case; and a second driver configured to provide power to the valve member.

The valve assembly may further include a valve shaft passing through the valve accommodating case, wherein one end of the valve shaft may be inserted in the valve member and the other end of the valve shaft is connected to the second driver.

The second driver may include: a motor; a valve transfer gear transferring power generated by the motor; and a valve coupling gear engaged with the transfer gear, wherein the valve shaft is inserted in the valve coupling gear.

The valve member may be rotatable between a first position at which the body closes the outlet and a second position at which the communicating portion opens the outlet.

The coupling gear may include a shaft passing groove opening upward such that the valve shaft is separable from the valve coupling gear at the first position of the valve member.

The valve coupling gear may rotate together with the valve member to interfere with a movement in upward direction of the valve shaft such that the shaft passing groove of the valve coupling gear opens in a sideward direction at the second position of the valve member.

The food waste disposer may further include: an upper frame provided in an upper portion of the housing; a bottom frame positioned below the upper frame and supporting the grinding device; and an accommodating frame fixed between the upper frame and the bottom frame and accommodating the grinding case.

The food waste disposer may further include a heater provided inside the accommodating frame, heating the grinding case from below the grinding case, and including a heating wire accommodating frame in which a heating wire is positioned.

The valve assembly may further include: a valve member rotating to open and close the outlet; and a valve shaft inserted in the valve member and transferring power to the valve member, wherein the heating wire accommodating frame may include a passing groove such that the valve shaft is movable upward in a case in which the grinding case and the valve assembly are separated from the housing.

The bottom frame may include an incision portion formed in a front portion of the bottom frame such that the valve assembly protruding downward from the grinding case is accommodated in the incision portion.

The food waste disposer may further include: a valve sealing member accommodated inside the valve accommodating case and being in contact with the valve member to prevent a foreign material from leaking out of the valve member; and a support member accommodated between the valve accommodating case and the valve sealing member and supporting the valve sealing member pressing the valve member.

The support member may be accommodated in a support accommodating portion of the valve accommodating case and a support accommodating groove of the valve sealing member, the support member being deformable.

A food waste disposer according to another concept of the disclosure includes: a housing; a grinding device positioned inside the housing, configured to grind food waste, and being separable from the housing; and a driver positioned below the grinding device and configured to provide power to the grinding device, wherein the grinding device includes: a grinding case configured to grind the food waste, and including an outlet opening in a bottom plate of the grinding case to discharge the grinded food waste; and a valve assembly including a valve member positioned below the grinding case and opening and closing the outlet and a valve shaft inserted in the valve member and transferring power, and the driver includes a valve coupling gear in which the valve shaft is inserted and interfering with a movement of the valve shaft in a case in which the valve shaft rotates such that the valve member opens the outlet.

The valve assembly may be separable from the housing together with the grinding case in a case in which the valve member closes the outlet.

The valve coupling gear may include a shaft passing groove in which the valve shaft is inserted and which opens upward in a case in which the valve shaft rotates such that the valve member closes the outlet.

A food waste disposer according to another concept of the disclosure includes: a housing; a grinding case positioned inside the housing, configured to grind food waste, and including an outlet formed in a bottom plate of the grinding case; a valve accommodating case communicating with the outlet of the grinding case and protruding downward; a valve member accommodated inside the valve accommodating case and being rotatable between a first position closing the outlet and a second position opening the outlet; a valve shaft penetrating the valve accommodating case, wherein one end of the valve shaft is inserted in the valve member to transfer power to the valve member; and a valve coupling gear in which the other end of the valve shaft is inserted, the valve coupling gear being separable from the valve shaft at the first position of the valve member.

Both the grinding case and the valve member may be separable from the housing.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
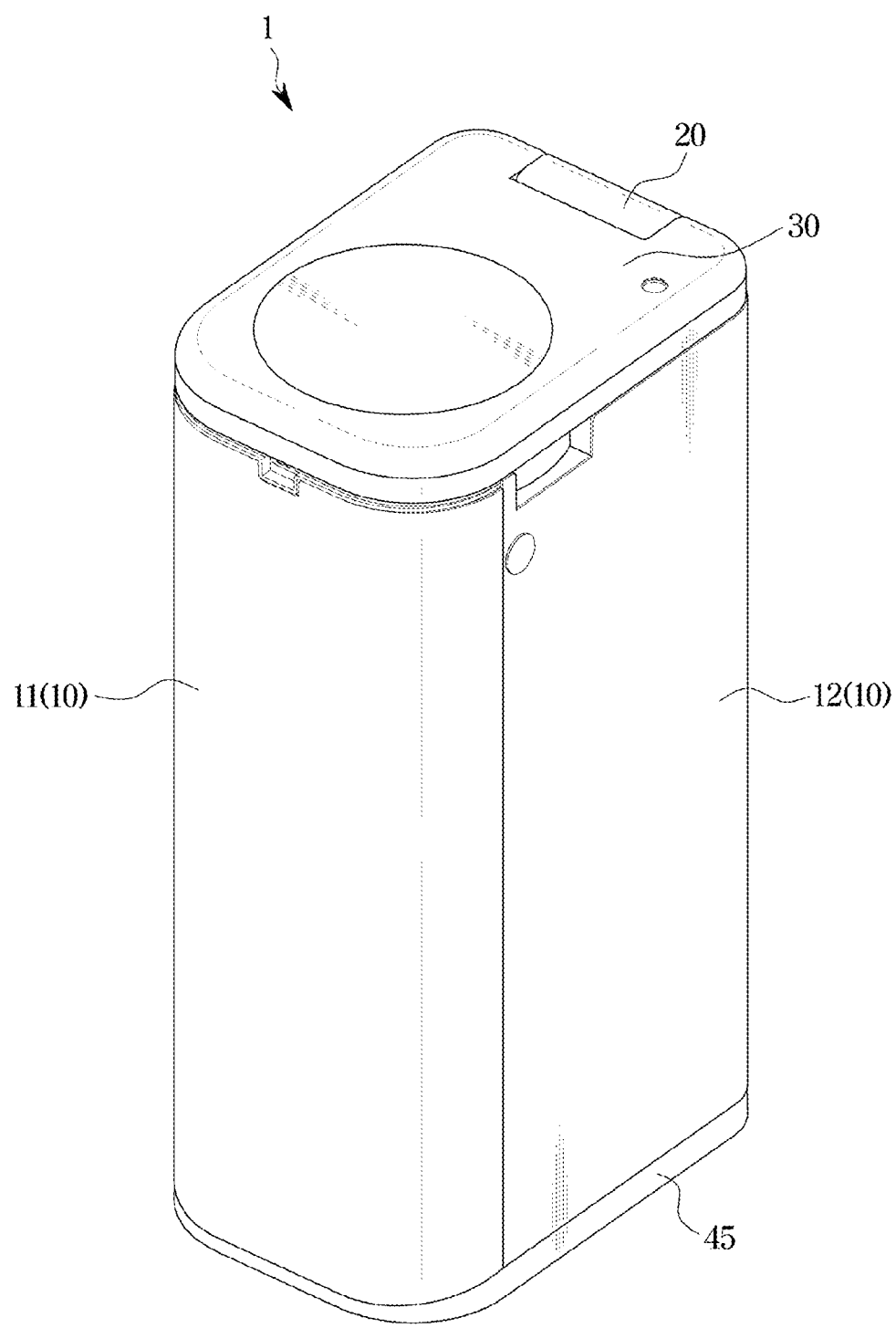
FIG. 1 illustrates a perspective view of a food waste disposer according to an embodiment of the disclosure.

FIGS. 1 through 29, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It is to be understood that various modified examples, which may replace the embodiments and the drawings described in the present specification, are possible.

Also, like reference numerals or symbols denoted in the drawings of the present specification represent members or components that perform the substantially same functions.

Also, the terms used in the present specification are merely used to describe embodiments, and are not intended to restrict and/or limit the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

It will be understood that, although the terms including ordinal numbers, such as "first", "second", etc., may be used herein to describe various components, these components should not be limited by these terms. These terms are used to distinguish one component from another. For example, a first component could be termed a second component, and, similarly, a second component could be termed a first component, without departing from the scope of the disclosure. As used herein, the term "and/or" includes any and all combinations of one or more of associated listed items.

Throughout the disclosure, the expression "at least one of a, b or c" indicates only a, only b, only c, both a and b, both a and c, both b and c, all of a, b, and c, or variations thereof.

Hereinafter, embodiments of the disclosure are described in detail with reference to the accompanying drawings.

Figure 2:
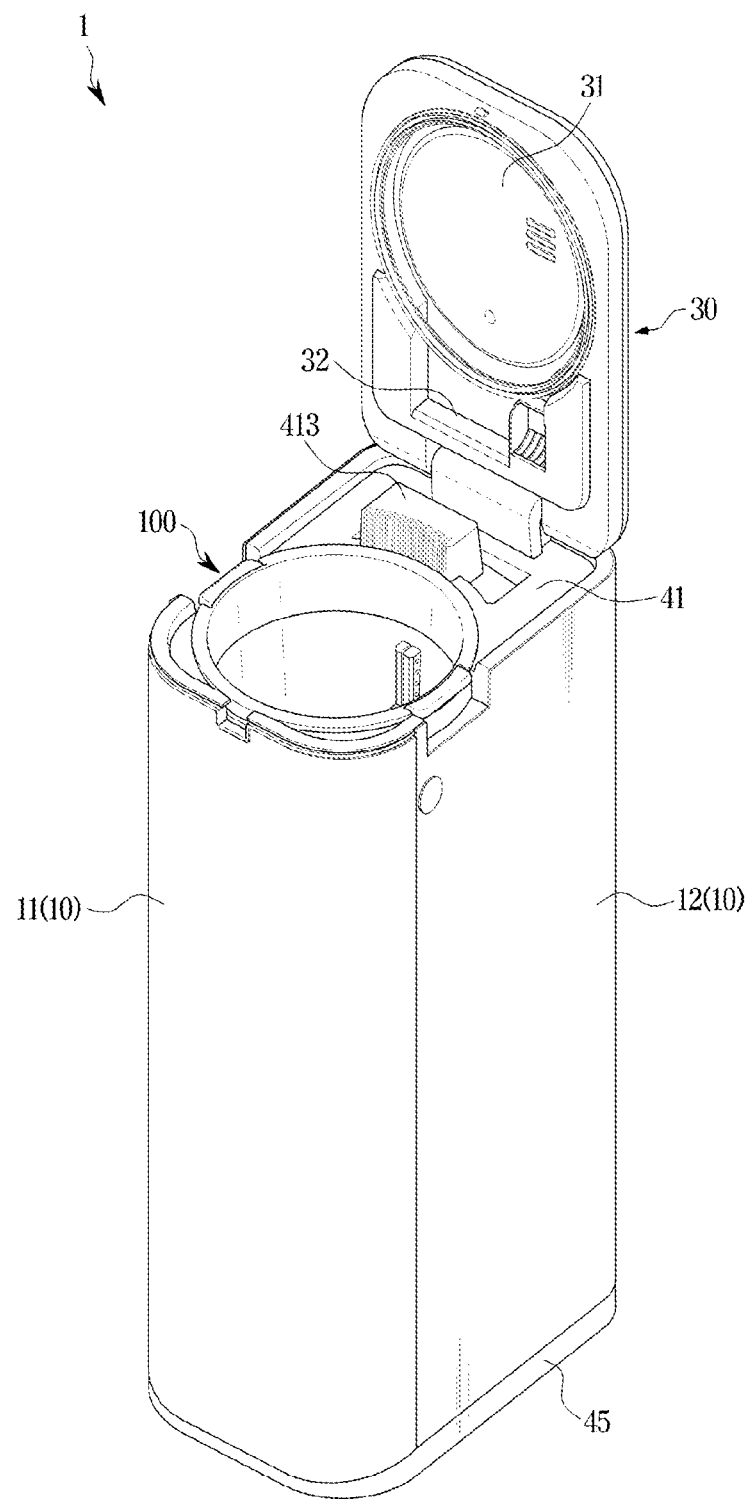
FIG. 2 illustrates a perspective view showing an open state of a cover member of the food waste disposer of FIG. 1 according to an embodiment of the disclosure.
Figure 3:
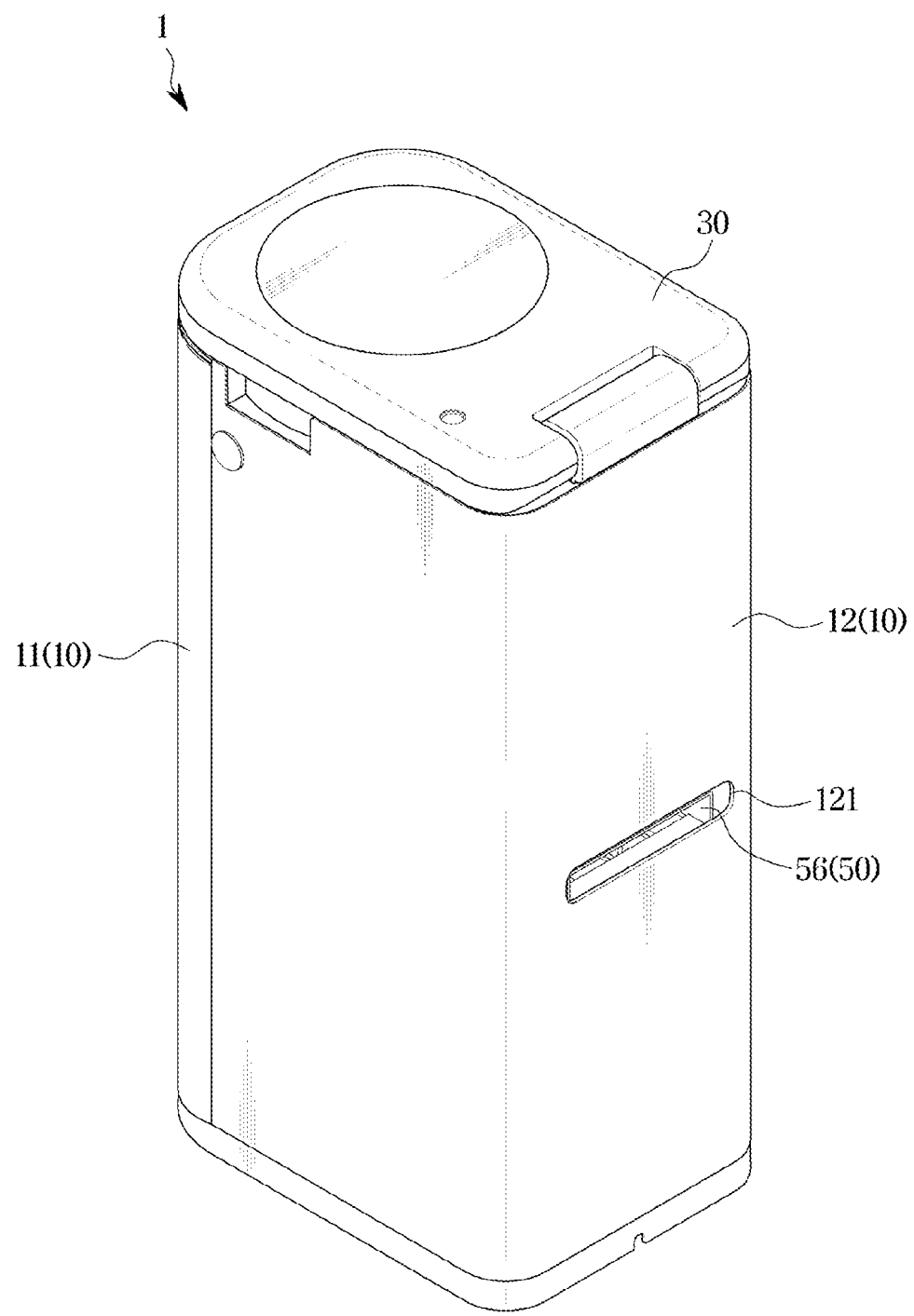
FIG. 3 illustrates a perspective view showing a rear side of the food waste disposer of FIG. 1 according to an embodiment of the disclosure.

FIG. 1 illustrates a perspective view of a food waste disposer according to an embodiment of the disclosure. FIG. 2 illustrates a perspective view showing an open state of a cover member of the food waste disposer of FIG. 1 according to an embodiment of the disclosure. FIG. 3 illustrates a perspective view showing a rear side of the food waste disposer of FIG. 1 according to an embodiment of the disclosure.

Referring to FIGS. 1 to 3, a food waste disposer 1 according to an embodiment of the disclosure may include a housing 10 forming an outer appearance, and a cover member 30 for opening and closing an upper side of the housing 10.

The cover member 30 may be rotatable with respect to the housing 10 through a hinge 20.

The housing 10 may include a front housing 11 and a rear housing 12. The front housing 11 may form a front outer appearance of the food waste disposer 1. The rear housing 12 may form a rear outer appearance of the food waste disposer 1.

The front housing 11 and the rear housing 12 may be mounted on a base frame 45 forming a bottom of the food waste disposer 1.

The front housing 11 may be detachable from the rear housing 12. Accordingly, a user may separate the front housing 11 from the rear housing 12 to access various components installed inside the food waste disposer 1.

The cover member 30 may include a grinding device cover 31 and an upper frame receiver 32.

The grinding device cover 31 may be positioned in a front portion of the cover member 30 to open and close an open upper side of a grinding device 100.

The upper frame receiver 32 may be positioned behind the grinding device cover 31. The upper frame receiver 32 may accommodate a portion of an inlet 413 of an upper frame 41 which are described below. Accordingly, the upper frame receiver 32 may be depressed inward from the cover member 30.

The grinding device 100 may be installed inside the housing 10. More specifically, the grinding device 100 may pass through a front portion of the upper frame 41 and be accommodated in the housing 10. Details about this are described below.

The rear housing 12 may include an exhaust hole 121. The exhaust hole 121 may communicate with an exhaust case 56 of a deodorization device 50 which are described below. The deodorization device 50 may suck bad smell from the grinding device 100, filter the bad smell, and then discharge filtered air to outside. At this time, the filtered air may be discharged to the outside through the exhaust hole 121 of the rear housing 12.

Figure 4:
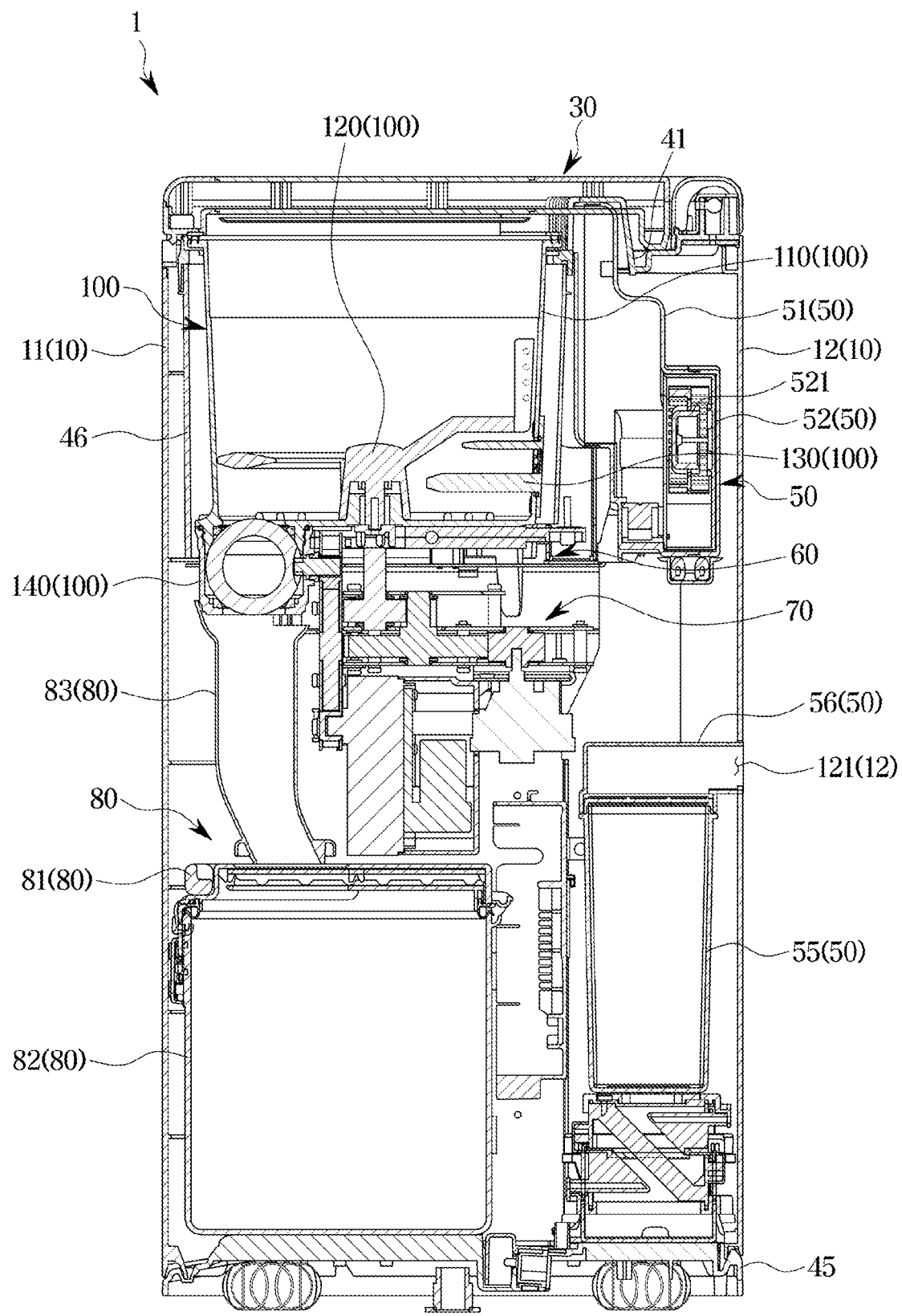
FIG. 4 illustrates a cross-sectional view of the food waste disposer of FIG. 1 according to an embodiment of the disclosure.

FIG. 4 illustrates a cross-sectional view of the food waste disposer of FIG. 1 according to an embodiment of the disclosure.

Referring to FIG. 4, the food waste disposer 1 may include the grinding device 100 positioned in a front upper portion. The grinding device 100 may be positioned below the cover member 30. The cover member 30 may open and close the open upper side of the grinding device 100. Alternatively, the cover member 30 may open and close the upper side of the housing 10.

The food waste disposer 1 may include a heater 60.

The heater 60 may be positioned below the grinding device 100 and heat the grinding device 100. More specifically, the heater 60 may include a heating wire accommodating frame accommodating a heating wire therein. The heating wire accommodating frame 61 may be positioned below a grinding case 110 of the grinding device 100.

The grinding device 100 may be positioned inside an accommodating frame 46 fixed inside the housing 10. Also, the heater 60 may be positioned inside the accommodating frame 46.

The accommodating frame 46 may cover outer sides of the grinding device 100 and the heater 60 such that the grinding device 100 and the heater 60 are more stably supported and accommodated inside the food waste disposer 1.

The food waste disposer 1 may include a driver 70.

The driver 70 may be positioned below the grinding device 100 and the heater 60. The driver 70 may transfer power to the grinding device 100.

More specifically, the driver 70 may transfer power to a rotating grinder 120 (which are described below) of the grinding device 100 and to a valve assembly 140 of the grinding device 100.

The driver 70 may be supported at both sides by a side frame 44 which are described below, and be fixed to a lower portion of the grinding device 100.

The food waste disposer 1 may include the deodorization device 50.

The deodorization device 50 may suck bad smell, etc. generated from the grinding device 100. Bad smell sucked into the deodorization device 50 may be filtered and then discharged to an external area outside of the food waste disposer 1.

More specifically, the deodorization device 50 may suck smell from above the grinding device 100. Accordingly, the deodorization device 50 may be positioned behind the grinding device 100.

The food waste disposer 1 may include a storage device 80.

The storage device 80 may store food waste dried and grinded by the grinding device 100 and transferred from the grinding device 100.

More specifically, the storage device 80 may include a transfer duct 83 connected to the valve assembly 140 of the grinding device 100.

The valve assembly 140 of the grinding device 100 may open and close an outlet 114 (see FIG. 8) of the grinding device 100.

In a case in which the valve assembly 140 opens the outlet 114 of the grinding case 110, grinded food waste existing inside the grinding case 110 may be transferred to a storage case 82 of the storage device 80 through the transfer duct 83.

Figure 5:
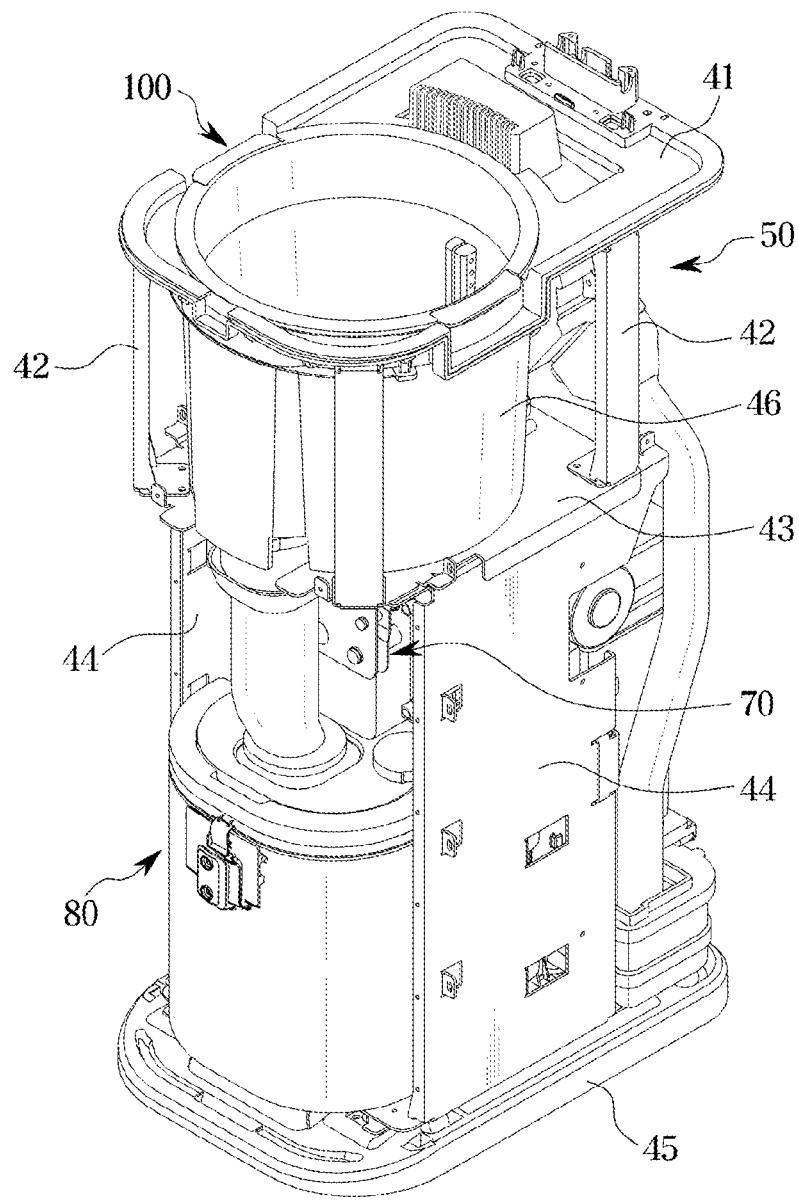
FIG. 5 illustrates a perspective view showing a food waste disposer after a housing and a cover member are removed from the food waste disposer according to an embodiment of the disclosure.
Figure 6:
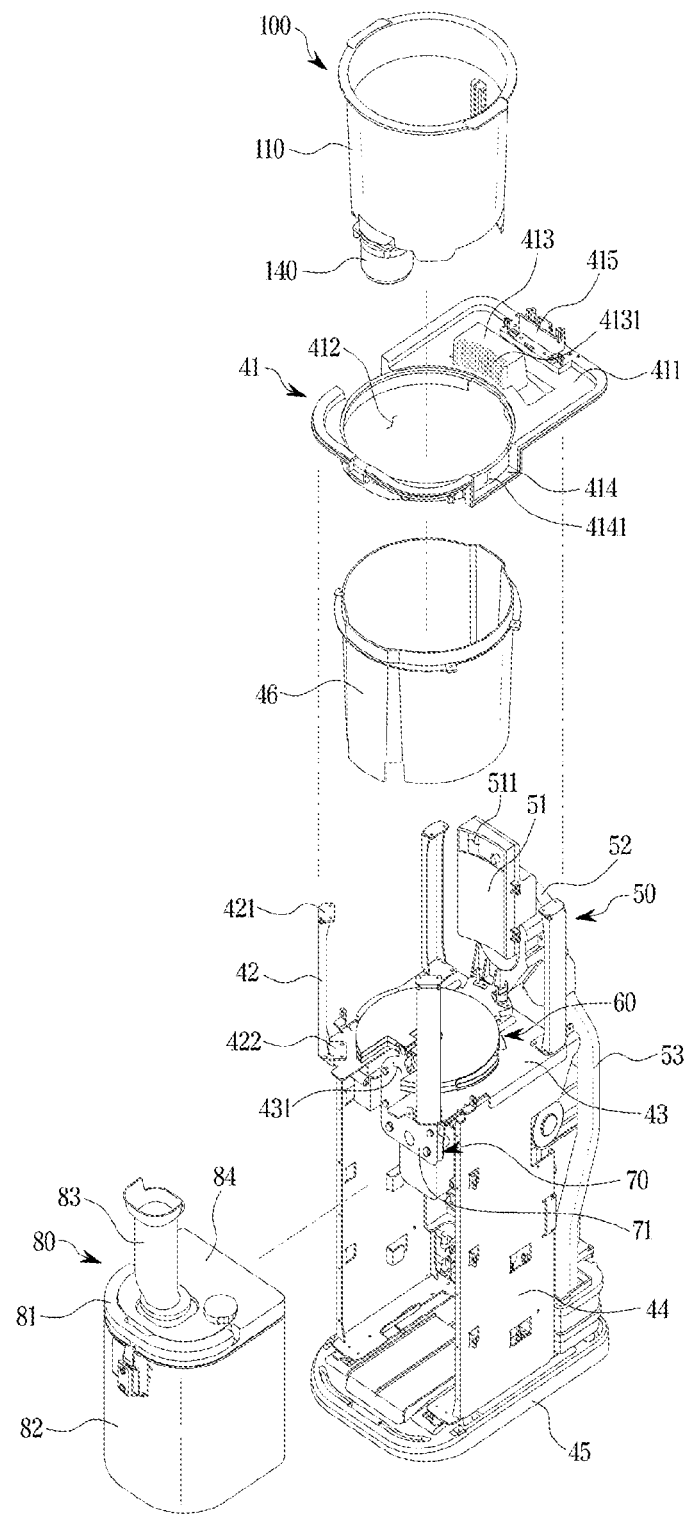
FIG. 6 illustrates an exploded perspective view of the food waste disposer of FIG. 5 according to an embodiment of the disclosure.
Figure 7:
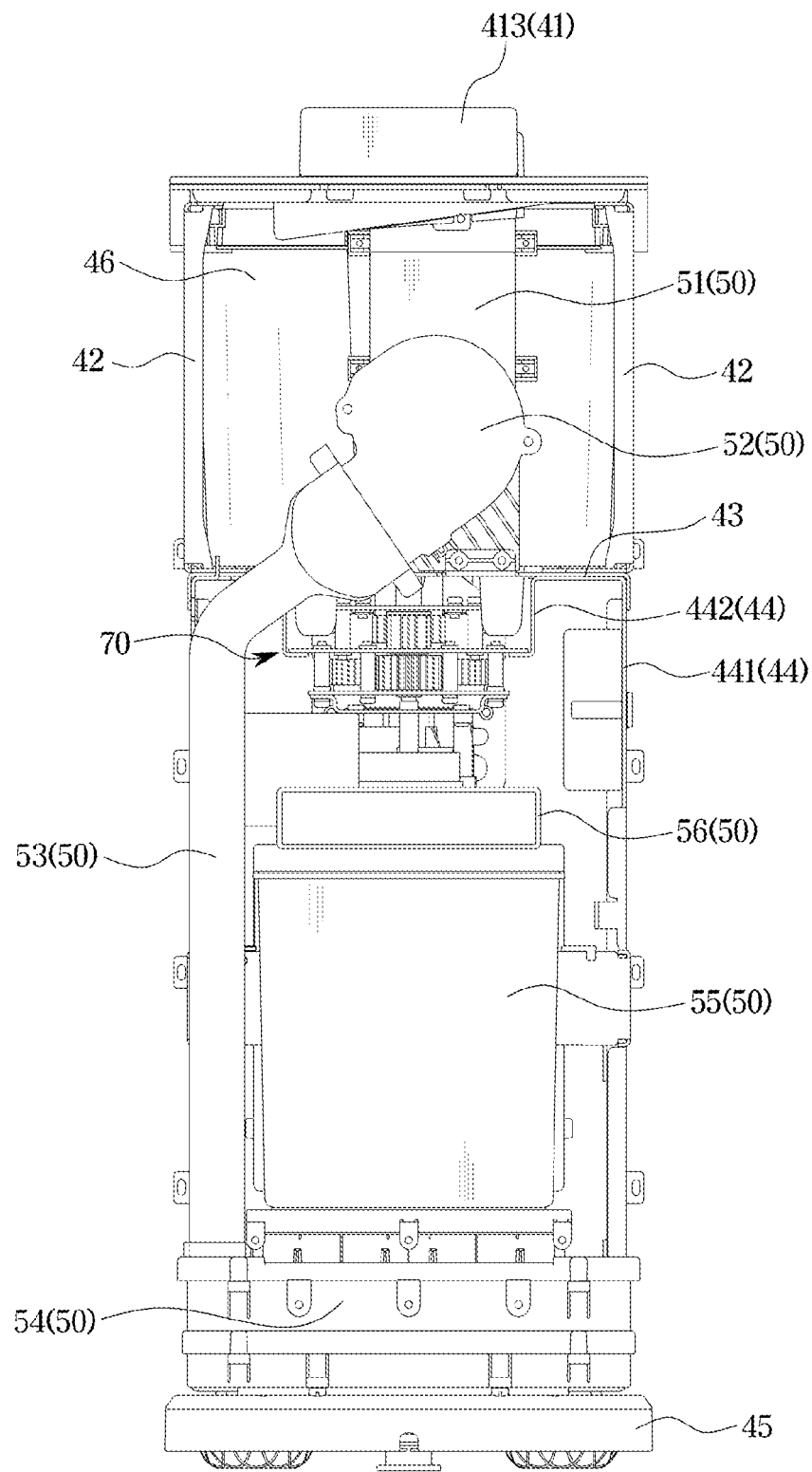
FIG. 7 illustrates a rear side of the food waste disposer of FIG. 5 according to an embodiment of the disclosure.

FIG. 5 illustrates a perspective view showing a food waste disposer after a housing and a cover member are removed from the food waste disposer according to an embodiment of the disclosure. FIG. 6 illustrates an exploded perspective view of the food waste disposer of FIG. 5 according to an embodiment of the disclosure. FIG. 7 illustrates a rear side of the food waste disposer of FIG. 5 according to an embodiment of the disclosure.

Referring to FIGS. 5 to 7, the food waste disposer 1 according to an embodiment of the disclosure may include a plurality of frames for supporting the grinding device 100, the deodorization device 50, the storage device 80, the driver 70, etc.

The food waste disposer 1 may include the upper frame 41. The grinding device 100 may be inserted in the front portion of the upper frame 41.

The upper frame 41 may include a base 411. The base 411 may form an upper surface of the upper frame 41.

The upper frame 41 may include an opening 412 formed in front of the base 411. The grinding device 100 may be separated from the housing 10 through the opening 412. Also, the opening 412 may have a size corresponding to the open upper side of the grinding device 100.

Accordingly, a user may put food waste into the inside of the grinding device 100 through the opening 412. That is, the opening 412 may be provided as an entrance. The cover member 30 may open and close the opening 412 of the upper frame 41.

The upper frame 41 may include the inlet 413 positioned behind the opening 412. The inlet 413 may protrude upward from the base 411 of the upper frame 41.

The inlet 413 may accommodate a portion of the deodorization device 50. More specifically, an upper portion of a communicating case 51 (are described below) of the deodorization device 50 may be accommodated in the inlet 413.

A communicating hole 4131 communicating with the grinding device 100 may be formed in the inlet 413 of the upper frame 41. A plurality of communicating holes 4131 may be provided.

Accordingly, inside air of the grinding device 100 may flow to the inlet 413 through the communicating hole 4131 of the upper frame 41 by a suction force generated by the deodorization device 50, and the air entered the inlet 413 may flow to inside of the communicating case 51 of the deodorization device 50. Details about this are described below.

The upper frame 41 may include a depressed portion 414 at both sides. The depressed portion 414 may be bent downward from the base 411 of the upper frame 41. The depressed portion 414 may form a grip space 4141 therein.

Accordingly, a handle 113 (see FIG. 8) of the grinding device 100 may be positioned on the depressed portion 414 to enable a user to easily grip the handle 113 to separate the grinding device 100 from the housing 10.

The upper frame 41 may include a hinge installing portion 415 at a rear portion. The hinge 20 shown in FIG. 1 may be installed in the hinge installing portion 415. Accordingly, the cover member 30 may be rotatably coupled with the upper frame 41 through the hinge 20.

The food waste disposer 1 may include the accommodating frame 46.

The accommodating frame 46 may accommodate the grinding device 100 therein. The accommodating frame 46 may be positioned below the upper frame 41.

The accommodating frame 46 may be substantially in a shape of a cylinder of which upper and lower sides open.

The food waste disposer 1 may include a bottom frame 43.

The accommodating frame 46 may be mounted on the bottom frame 43. The heater 60 may be mounted on an upper surface of the bottom frame 43. An incision portion 431 may be formed in a front portion of the bottom frame 43.

Accordingly, the grinding case 110 of the grinding device 100 may be positioned on the upper surface of the heater 60, and the valve assembly 140 protruding downward from the grinding device 100 may pass through the bottom frame 43 to be positioned in front of the bottom frame 43.

The food waste disposer 1 may include a support frame 42. A plurality of support frames 42 may be provided to support the upper frame 41. In FIG. 6, four support frames 42 are shown, however, the number of the support frames 42 is not limited to four.

The support frame 42 may include an upper supporter 421 provided at an upper portion of the support frame 42 and supporting the upper frame 41. Also, the support frame 42 may include a bottom installing portion 422 provided at a lower portion of the support frame 42 and installed on the bottom frame 43.

The support frame 42 may be substantially in a shape of a bar, and support the upper frame 41 while occupying a small space.

The food waste disposer 1 may include the side frame 44 and the base frame 45 forming the bottom of the food waste disposer 1. A pair of side frames 44 may be provided.

The side frames 44 may be positioned respectively at both sides of a lower surface of the bottom frame 43. The side frames 44 may be positioned between the bottom frame 43 and the base frame 45.

The side frames 44 may include side bodies 441 covering both sides of the storage device 80.

Each side frame 44 may include a driver supporter 442 bent inward from the side body 441 and coupled with the bottom frame 43.

The storage device 80 may receive dried and grinded food waste from the grinding device 100 through the transfer duct 83. The storage device 80 may include the storage case 82. The storage case 82 may be connected to the transfer duct 83 and store grinded food waste.

The storage device 80 may include a case cover 84 provided at an upper portion of the storage case 82. A grip portion 81 that may be gripped may be installed in a front portion of the case cover 84.

The deodorization device 50 may include the communicating case 51.

The communicating case 51 may be positioned behind the grinding device 100. More specifically, an upper portion of the communicating case 51 may be accommodated in the inlet 413 of the upper frame 41.

The communicating case 51 may include an inlet hole 511 formed by cutting a front side of the communicating case 51. Water, bad smell, etc. generated in the inside of the grinding device 100 may enter the communicating hole 4131 formed in the inlet 413 of the upper frame 41 and the inlet hole 511 of the communicating case 51.

The deodorization device 50 may include a fan installing case 52.

The fan installing case 52 may be connected to the communicating case 51. The fan installing case 52 may form a suction airflow toward the communicating case 51 from the grinding device 100.

A blow fan 521 may be positioned inside the fan installing case 52 to generate a suction force.

The deodorization device 50 may include a deodorizing duct 53.

The deodorizing duct 53 may be connected to the fan installing case 52. The deodorizing duct 53 may form a path along which air entered the fan installing case 52 flows.

The deodorization device 50 may include a duct installing frame 54 and a filter 55.

The duct installing frame 54 may be connected to the deodorizing duct 53. The filter 55 may be installed on the duct installing frame 54.

A deodorizing filter (not shown) made of activated carbon, etc. may be positioned inside the filter 55 to filter polluted air generated in the grinding device 100. The filter 55 may include a filter case 551.

The deodorization device 50 may include an exhaust case 56.

The exhaust case 56 may be installed on one side of the filter 55 to cause air filtered by the filter 55 to flow. More specifically, the exhaust case 56 may be installed on an upper side of the filter 55.

Accordingly, the filtered air may communicate with the exhaust hole 121 of the rear housing 12 through the exhaust case 56 and then be discharged to the outside.

Figure 8:
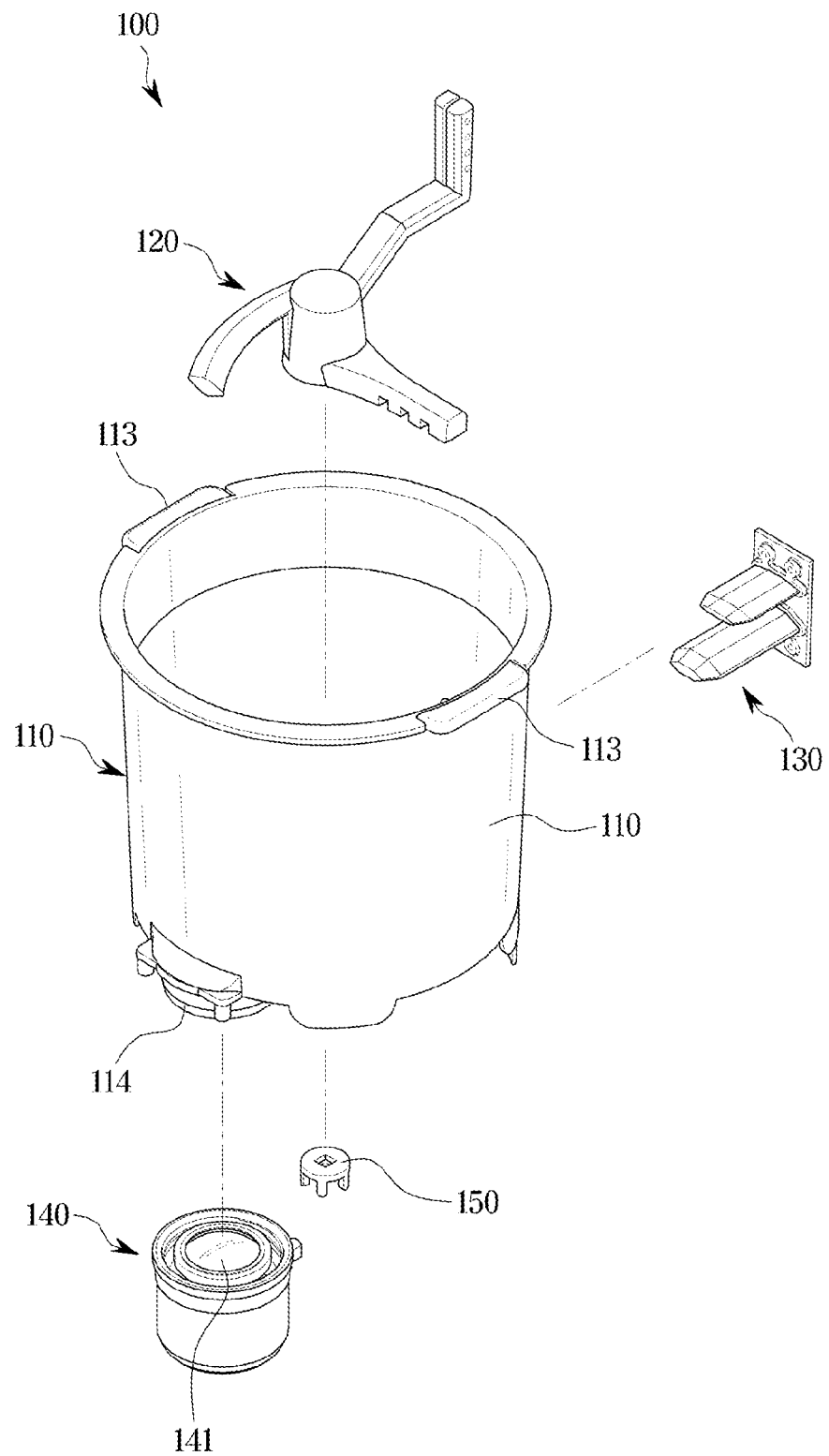
FIG. 8 illustrates an exploded view showing a grinding device of the food waste disposer of FIG. 6 according to an embodiment of the disclosure.

FIG. 8 illustrates an exploded perspective view of a grinding device in the food waste disposer of FIG. 6 according to an embodiment of the disclosure.

Referring to FIG. 8, the grinding device 100 may include the grinding case 110, and the rotating grinder 120 that is rotatable inside the grinding case 110.

The grinding case 110 may accommodate food waste therein. Food waste accommodated in the grinding case 110 may be dried, stirred, and grinded.

The grinding case 110 may be substantially in a shape of a cylinder of which an upper side opens.

The grinding case 110 may include a pair of handles 113. The pair of handles 113 may be provided at both sides of an upper end of the grinding case 110. The pair of handles 113 may protrude outward from the grinding case 110 to enable a user to grip the pair of handles 113.

The grinding case 110 may include the outlet 114 provided in a bottom plate 112. The outlet 114 may open to transfer food waste grinded in the grinding case 110 to the storage device 80.

The rotating grinder 120 may rotate by receiving power from inside of the grinding case 110. More specifically, the rotating grinder 120 may be coupled with a power transfer member 150 and power generated by the driver 70 may be transferred to the power transfer member 150 to rotate the rotating grinder 120.

The grinding device 100 may include a wall grinder 130.

The wall grinder 130 may be inserted into the inside of the grinding case 110 from outside of the grinding case 110. More specifically, the wall grinder 130 may be installed outside the grinding case 110 and protrude to the inside of the grinding case 110.

The wall grinder 130 may interwork with the rotating grinder 120 to grind food waste existing inside the grinding case 110. Details about this are described below.

The grinding device 100 may include the valve assembly 140.

The valve assembly 140 may be positioned below the grinding case 110. The valve assembly 140 may open and close an outlet 114 (see FIG. 11) formed in the bottom plate 112 of the grinding case 110.

Through the outlet 114 opened by the valve assembly 140, grinded food waste existing inside the grinding case 110 may be transferred to the storage device 80. Accordingly, the valve assembly 140 may be connected to the transfer duct 83 in such a way as to communicate with the transfer duct 83.

The valve assembly 140 may include a valve member 142. The valve member 142 may be a ball valve. Accordingly, the valve member 142 may rotate to open and close the outlet 114 of the grinding case 110.

In FIG. 8, the valve assembly 140 is shown to be a separate configuration, however, the valve assembly 140 and the grinding case 110 may be integrated into one body. Details about the valve assembly 140 are described below.

Figure 9:
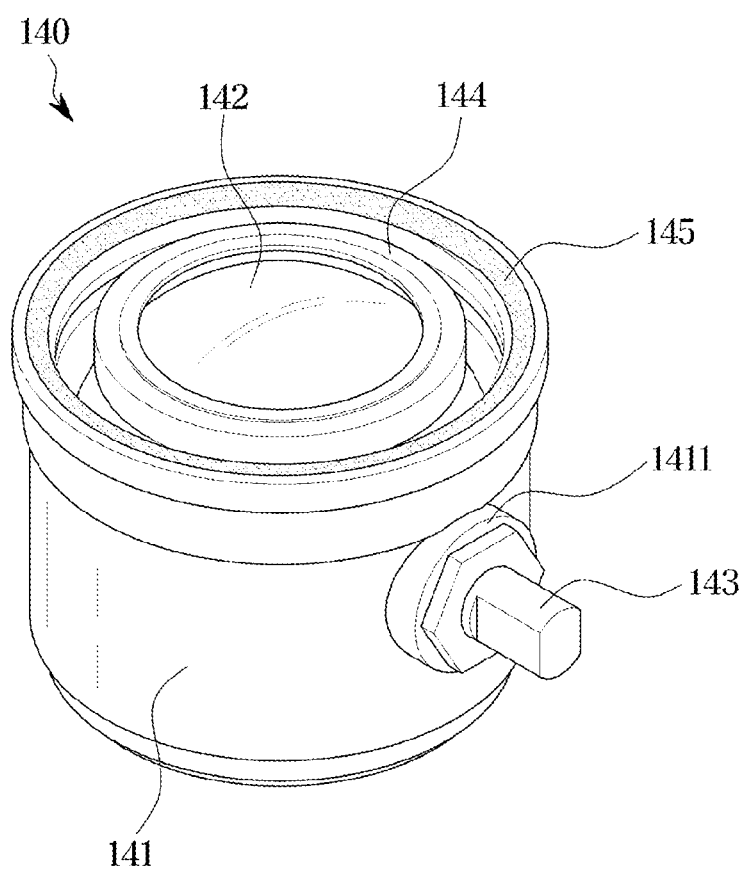
FIG. 9 illustrates a perspective view showing a valve assembly of the food waste disposer of FIG. 6 according to an embodiment of the disclosure.
Figure 10:
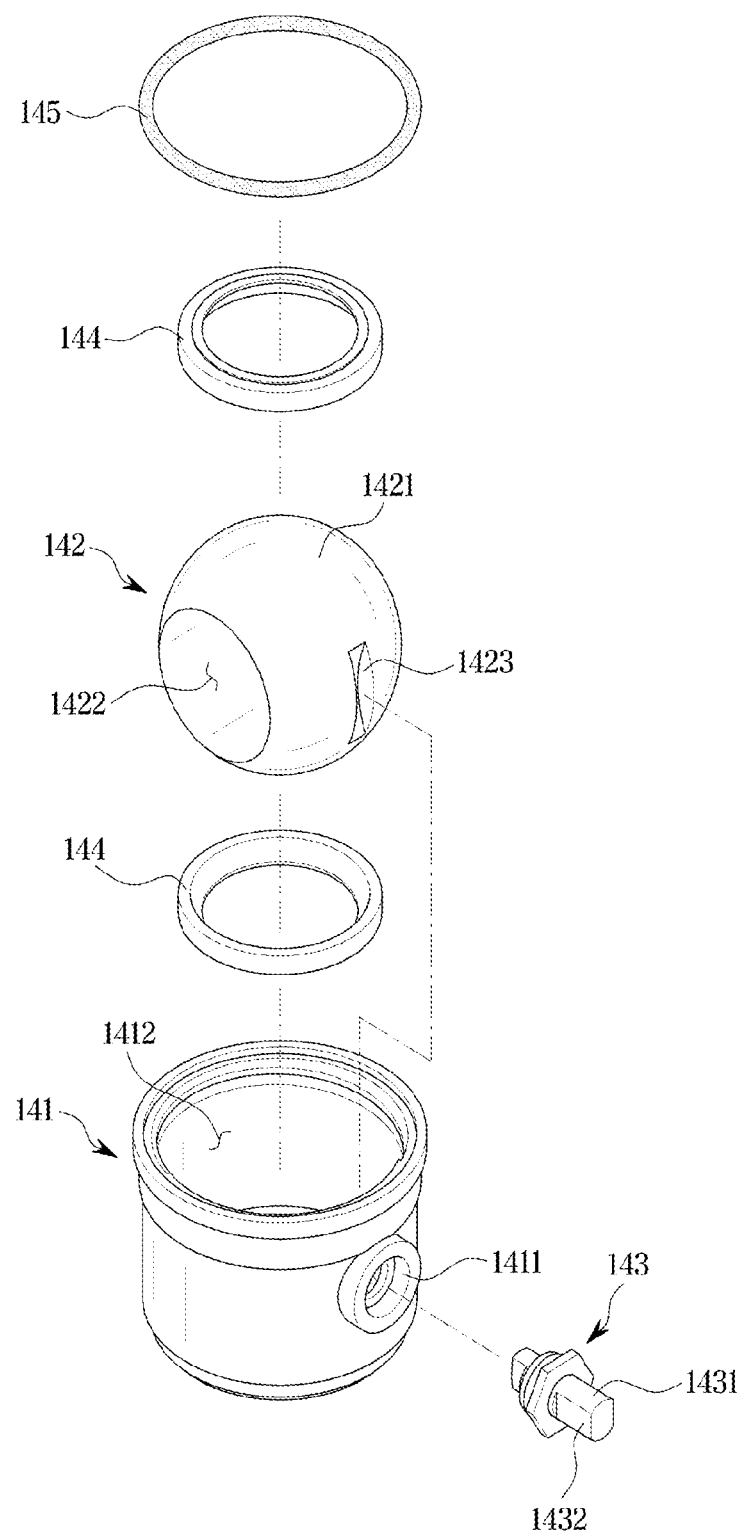
FIG. 10 illustrates an exploded perspective view of the valve assembly of FIG. 9 according to an embodiment of the disclosure.

FIG. 9 illustrates a perspective view showing a valve assembly of the food waste disposer of FIG. 6 according to an embodiment of the disclosure. FIG. 10 illustrates an exploded perspective view of the valve assembly of FIG. 9 according to an embodiment of the disclosure.

Referring to FIGS. 9 and 10, the valve assembly 140 may include a valve member 142 and a valve accommodating case 141.

The valve accommodating case 141 may accommodate the valve member 142. The valve accommodating case 141 may protrude downward from the grinding case 110.

The valve member 142 may be rotatable inside the valve accommodating case 141 to open and close the outlet 114. The valve member 142 may be a ball valve.

The valve accommodating case 141 may include a shaft inserting portion 1411 and an accommodating space 1412. A valve shaft 143 which are described below may be inserted into inside of the valve accommodating case 141 from outside of the valve accommodating case 141 through the shaft inserting portion 1411 of the valve accommodating case 141, and inserted into the valve member 142.

Also, the valve member 142 may be accommodated in the accommodating space 1412 of the valve accommodating case 141 in such a way as to be rotatable by the valve shaft 143 which are described below. The valve accommodating case 141 may be in a shape of a cylinder of which upper and lower sides open.

The valve member 142 may include a body 1421, a communicating portion 1422, and a shaft installing portion 1423.

The body 1421 of the valve member 142 may close the outlet 114 of the grinding case 110. More specifically, the body 1421 of the valve member 142 may be in a shape of a closed globe.

The communicating portion 1422 of the valve member 142 may be provided inside the body 1421. The communicating portion 1422 of the valve member 142 may be provided inside the body 1421 to open the outlet 114 of the grinding case 110. Accordingly, the valve member 142 may be in a shape of a globe of which the inside opens.

The shaft installing portion 1423 of the valve member 142 may be depressed longitudinally along an extension direction of the body 1421. More specifically, the shaft installing portion 1423 may extend longitudinally along an up-down direction.

Because a first shaft portion 1431 and a second shaft portion 1432 of the valve shaft 143 which are described below have different widths, the shaft installing portion 1423 may also have a narrow width in a left-right direction and extend with a long length in the up-down direction. Details about this are described below.

The valve member 142 may be rotatable between a first position at which the body 1421 closes the outlet 114 and a second position at which the communicating portion 1422 opens the outlet 114.

That is, at the first position of the valve member 142, the body 1421 may be positioned toward an up direction, and the communicating portion 1422 may be positioned toward a side direction. Also, at the second position of the valve member 142, the body 1421 may be positioned toward the side direction, and the communicating portion 1422 may be positioned toward the up direction.

Accordingly, at the first position of the valve member 142, the outlet 114 of the grinding case 110 may be closed, and food waste existing inside the grinding case 110 may be not transferred to the storage device 80 through the outlet 114.

However, at the second position of the valve member 142, the outlet 114 of the grinding case 110 may open, and food waste existing inside the grinding case 110 may move to the transfer duct 83 of the storage device 80 via the communicating portion 1422 of the valve assembly 140 through the outlet 114. Details about this are described below.

The valve assembly 140 may include a valve shaft 143.

The valve shaft 143 may be inserted to the inside of the valve accommodating case 141 through the shaft inserting portion 1411 of the valve accommodating case 141.

The valve shaft 143 may be accommodated in the shaft inserting portion 1411 and thus installed in the shaft installing portion 1423 of the valve member 142.

The valve shaft 143 may include the first shaft portion 1431 and the second shaft portion 1432.

Because the width of the first shaft portion 1431 is smaller than the width of the second shaft portion 1432, the valve shaft 143 may be in an asymmetrical shape.

Accordingly, the width of the first shaft portion 1431 of the valve shaft 143 may be similar to a width in horizontal direction of the shaft installing portion 1423 of the valve member 142.

The valve assembly 140 may include a first sheet member 144 and a second sheet member 145.

A pair of first sheet members 144 may be provided. The first sheet members 144 may be respectively positioned at upper and outer portions of the valve member 142 to wipe off food waste, etc. from the valve member 142.

The first sheet member 144 may have a size corresponding to that of the outlet 114 of the grinding case 110.

The second sheet member 145 may be installed at an upper edge of the valve accommodating case 141 to prevent food waste existing between the valve member 142 and the valve accommodating case 141 from being stuck.

The first sheet member 144 and the second sheet member 145 may be made of different materials. More specifically, the material of the first sheet member 144 may be softer than that of the second sheet member 145.

Figure 11:
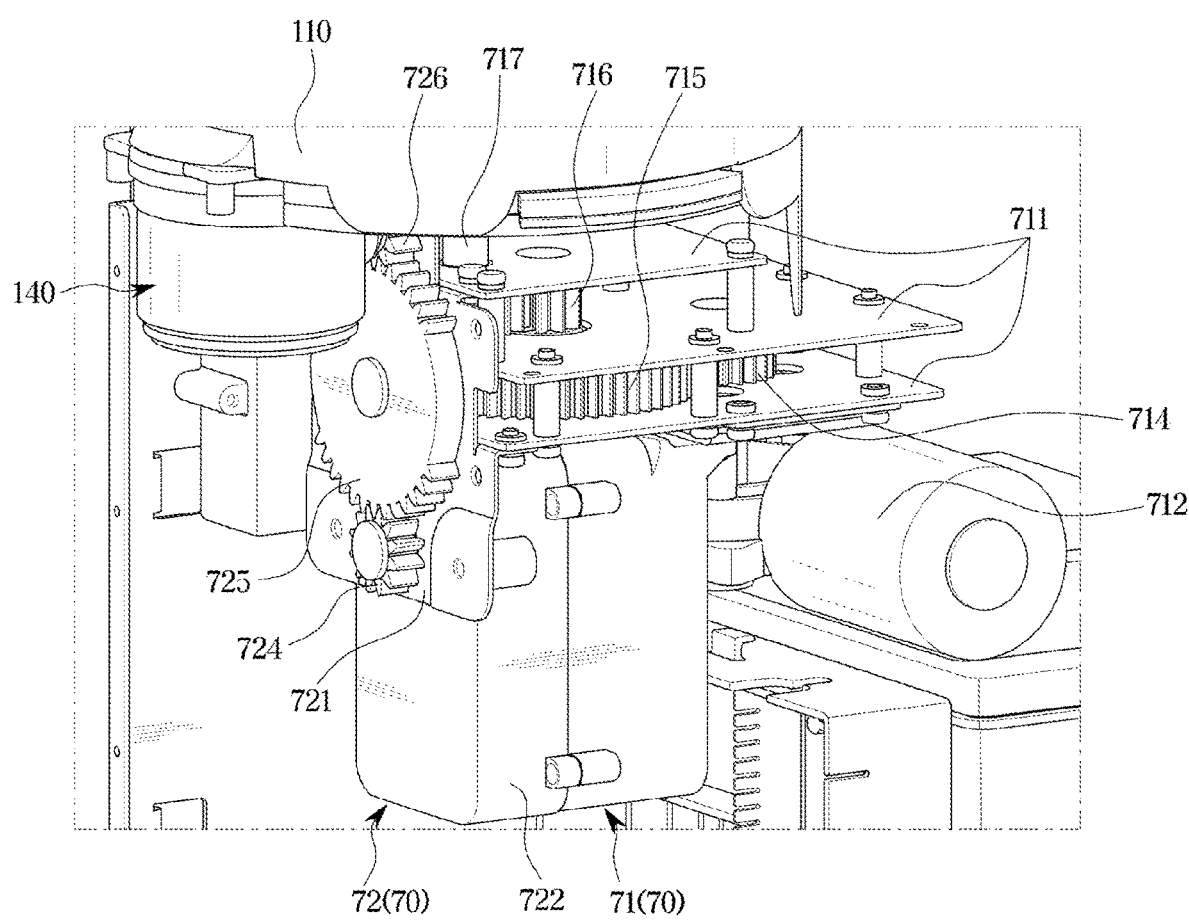
FIG. 11 illustrates an arrangement of a grinding device and a driver of a food waste disposer according to an embodiment of the disclosure.
Figure 12:
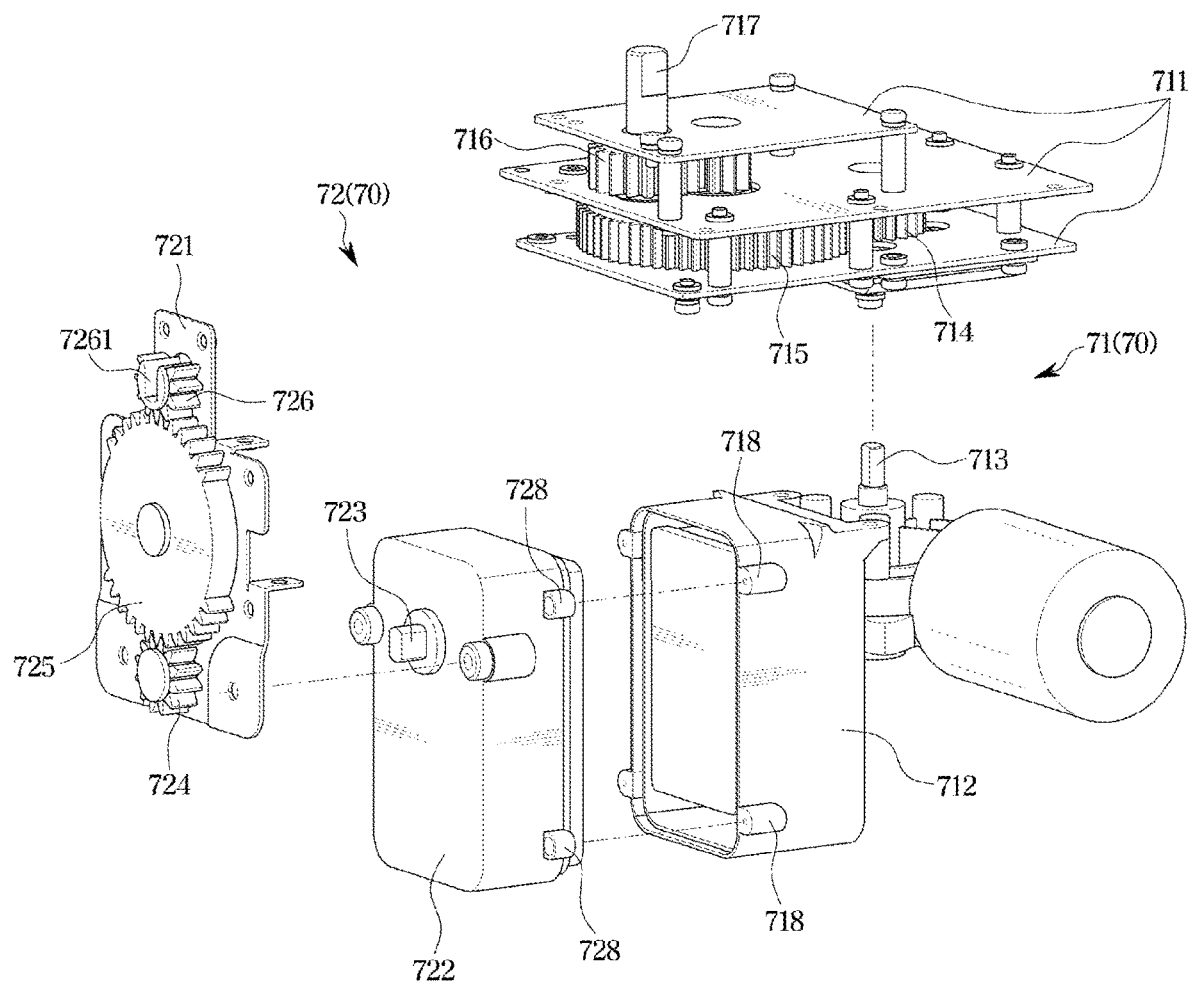
FIG. 12 illustrates an exploded perspective view of a driver of a food waste disposer according to an embodiment of the disclosure.
Figure 13:
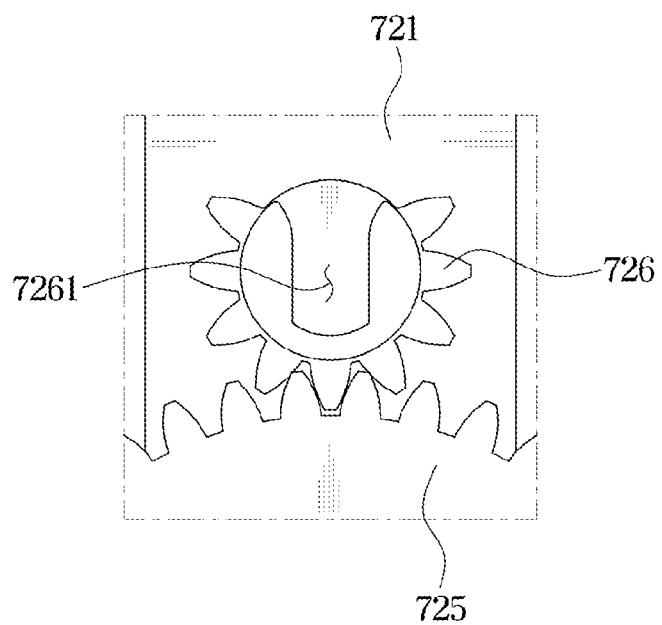
FIG. 13 illustrates an enlarged front view of a valve coupling gear of FIG. 12 according to an embodiment of the disclosure.

FIG. 11 illustrates an arrangement of a grinding device and a driver of a food waste disposer according to an embodiment of the disclosure. FIG. 12 illustrates an exploded perspective view of a driver of a food waste disposer according to an embodiment of the disclosure. FIG. 13 illustrates an enlarged front view of a valve coupling gear of FIG. 12 according to an embodiment of the disclosure.

Referring to FIG. 11, the driver 70 may be positioned below the grinding device 100 including the valve assembly 140 and the grinding case 110.

The driver 70 may include a first driver 71 and a second driver 72. More specifically, the first driver 71 may provide power to the rotating grinder 120 rotating inside the grinding case 110. The second driver 72 may provide power to the valve member 142 of the valve assembly 140.

The first driver 71 may be positioned behind the second driver 72. The second driver 72 may be connected to the valve assembly 140. More specifically, the valve shaft 143 of the valve assembly 140 may receive power from the second driver 72. Details about this are described below.

Referring to FIGS. 11 and 12, the first driver 71 may be connected to inside of the grinding case 110 to provide power to the rotating grinder 120.

The first driver 71 may include a first motor 712 and a first motor shaft 713.

The first motor 712 may generate power. The first motor 712 may include a first motor shaft 713 extending in an upward direction.

The first driver 71 may include a first gear installing plate 711, a first grinder transfer gear 714, and a second grinder transfer gear 715.

The first motor shaft 713 may provide power to the first grinder transfer gear 714. The first grinder transfer gear 714 and the second grinder transfer gear 715 may be installed on the first gear installing plate 711. A plurality of first gear installing plates 711 may be provided.

The first driver 71 may include a grinder coupling gear 716 and a grinder shaft 717.

Power may be transferred to the first grinder transfer gear 714 through the first motor shaft 713, and the first grinder transfer gear 714 may be engaged with the second grinder transfer gear 715 to transfer power to the second grinder transfer gear 715. The second grinder transfer gear 715 may transfer power to the grinder coupling gear 716. Accordingly, the grinder shaft 717 extends upwards from the grinder coupling gear 716 and may rotate.

The grinder shaft 717 may be coupled with the power transfer member 150 of the grinding device 100 described above. The power transfer member 150 may be connected to a center body of the rotating grinder 120 of the grinding device 100. Accordingly, a rotation of the grinder shaft 717 may be transferred to a rotation of the rotating grinder 120.

The second driver 72 may be connected to the valve assembly 140 to provide power to the valve member 142.

The second driver 72 may include a second motor 722 and a second motor shaft 723.

The second motor 722 may generate power. The second motor 722 may include the second motor shaft 723 extending in a frontward direction.

The second driver 72 may include a second gear installing plate 721, a first valve transfer gear 724, and a second valve transfer gear 725.

The second motor shaft 723 may provide power to the first valve transfer gear 724. The first valve transfer gear 724 and the second valve transfer gear 725 may be supported by the second gear installing plate 721.

The first valve transfer gear 724 may be engaged with the second valve transfer gear 725, and power transferred to the first valve transfer gear 724 may be transferred to the second valve transfer gear 725.

The second driver 72 may include a valve coupling gear 726.

The valve coupling gear 726 may be engaged with the second valve transfer gear 725.

The valve shaft 143 of the valve assembly 140 may be inserted in the valve coupling gear 726. More specifically, one end of the valve shaft 143 may be inserted in the valve member 142, and the other end of the valve shaft 143 may be connected to the valve coupling gear 726.

The first motor shaft 713 of the first motor 712 may be perpendicular to the second motor shaft 723 of the second motor 722. That is, the first grinder transfer gear 714 and the second grinder transfer gear 715 that receive power from the first motor shaft 713 may be positioned horizontally. Also, the grinder coupling gear 716 may be positioned horizontally.

Also, the first valve transfer gear 724 and the second valve transfer gear 725 that receive power from the second motor shaft 723 may be positioned vertically. Additionally, the valve coupling gear 726 may be positioned vertically.

Accordingly, the first driver 71 may be positioned adjacent to the second driver 72, thereby reducing the entire size of the driver 70. That is, the food waste disposer 1 may be configured with a compact size.

Referring to FIGS. 12 and 13, the valve coupling gear 726 may include a shaft passing groove 7261.

The valve shaft 143 may be inserted in the shaft passing groove 7261 of the valve coupling gear 726. Accordingly, the valve shaft 143 may rotate together with the valve coupling gear 726 rotating. As a result, the valve member 142 connected to the valve shaft 143 may rotate.

The valve member 142 may be rotatable between the first position closing the outlet 114 and the second position opening the outlet 114.

In a case in which the valve member 142 is at the first position closing the outlet 114, the shaft passing groove 7261 of the valve coupling gear 726 may open upward. In this case, a user may lift the grinding device 100 upward. At this time, the valve shaft 143 inserted in the shaft passing groove 7261 may freely move upward. That is, the grinding device 100 may be separated from the housing 10.

In a case in which the valve member 142 is at the second position opening the outlet 114, the shaft passing groove 7261 of the valve coupling gear 726 may open in a sideward direction. In other words, the valve coupling gear 726 may be in a state rotated by 90 degrees from a state of the valve coupling gear 726 shown in FIGS. 12 and 13.

In this case, a user may lift the grinding device 100 upward. At this time, a movement in up direction of the valve shaft 14 inserted in the shaft passing groove 7261 may be interfered by the valve coupling gear 726. That is, the grinding device 100 may be not separated from the housing 10.

An operation in which the valve member 142 opens the outlet 114 may be performed by the second driver 72 controlled by a controller (not shown) that receives a signal indicating that grinding has been completed. In this case, the rotating grinder 120 of the grinding device 100 may rotate to transfer grinded food waste existing inside the grinding case 110 to the outlet 114.

At this time, in a case in which a user forcedly separates the grinding device 100 from the housing 10, a malfunction or breakdown may occur.

Accordingly, the food waste disposer 1 according to an embodiment of the disclosure may prevent the grinding device 100 from being separated from the housing 10 upon opening of the outlet 114 by the valve member 142, thereby preventing a breakdown and a safety accident in advance.

Figure 14:
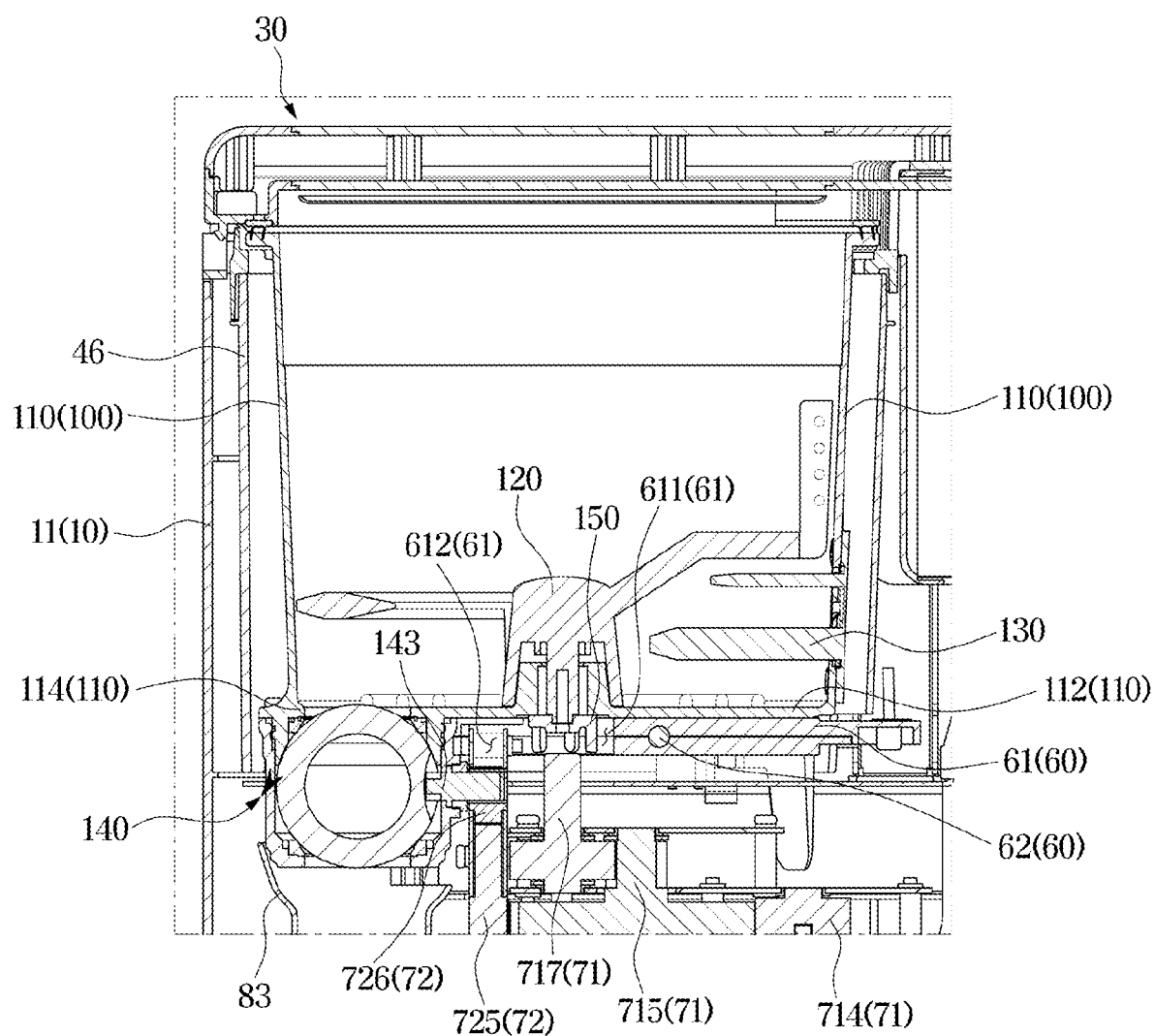
FIG. 14 illustrates a cross-sectional view showing a grinding device and a driver installed in a housing, in a food waste disposer according to an embodiment of the disclosure.

FIG. 14 illustrates a cross-sectional view showing a grinding device and a driver installed in a housing, in a food waste disposer according to an embodiment of the disclosure.

Referring to FIG. 14, the grinding device 100 may be positioned inside the accommodating frame 46. More specifically, the grinding case 110 of the grinding device 100 may be positioned inside the accommodating frame 46.

The valve assembly 140 of the grinding device 100 may protrude from a front lower portion of the grinding case 110.

The heater 60 including the heating wire 62 and the heating wire accommodating frame 61 may be positioned below the grinding device 100 to heat the grinding device 100.

The heating wire accommodating frame 61 of the heater 60 may include a first passing groove 611 and a second passing groove 612.

The rotating grinder 120 of the grinding device 100, positioned above the heater 60, may be coupled with the grinder shaft 717 of the first driver 71, positioned below the heater 60, through the first passing groove 611.

The second passing groove 612 may be formed in front of the first passing groove 611. The second passing groove 612 may be incised to freely move the valve shaft 143 upward upon separating of the grinding device 100 from the housing 10.

The valve assembly 140 may open and close the outlet 114 of the grinding case 110 and be connected to the transfer duct 83 of the storage device 80.

Figure 15:
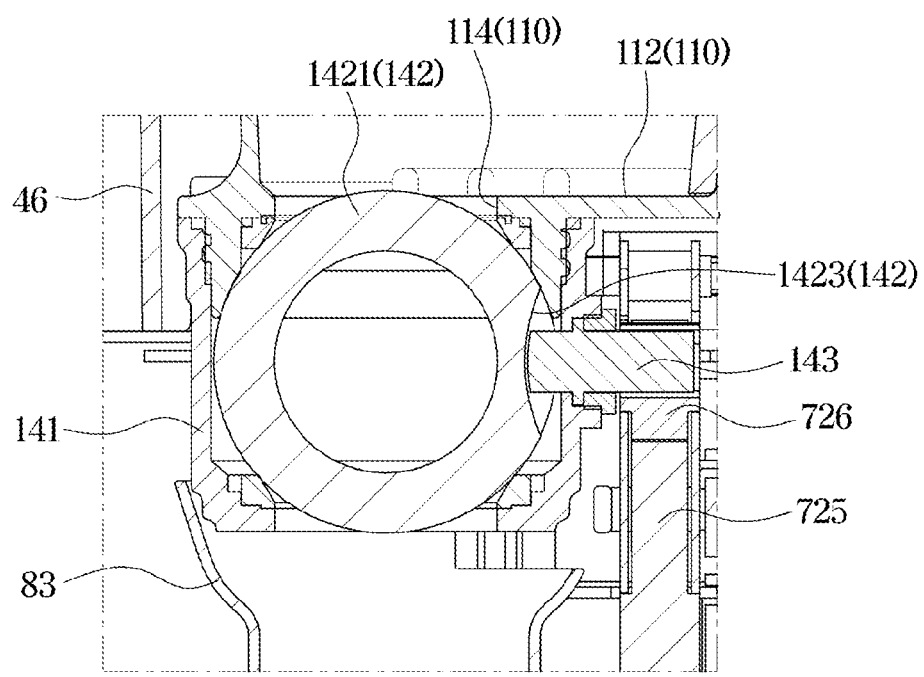
FIG. 15 illustrates a cross-sectional view showing a state in which a valve assembly closes an outlet of a grinding case, in a food waste disposer according to an embodiment of the disclosure.
Figure 16:
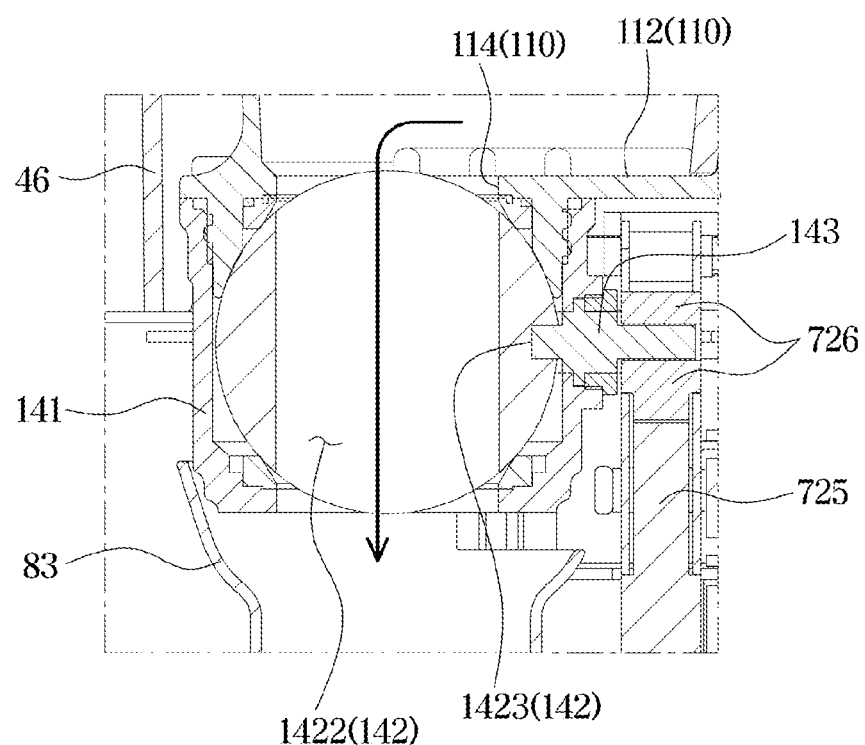
FIG. 16 illustrates a cross-sectional view showing a state in which a valve assembly opens an outlet of a grinding case, in a food waste disposer according to an embodiment of the disclosure.

FIG. 15 illustrates a cross-sectional view showing a state in which a valve assembly closes an outlet of a grinding case, in a food waste disposer according to an embodiment of the disclosure. FIG. 16 illustrates a cross-sectional view showing a state in which a valve assembly opens an outlet of a grinding case, in a food waste disposer according to an embodiment of the disclosure.

An operation in which the valve assembly 140 opens and closes the outlet 114 are described with reference to FIGS. 15 and 16.

As shown in FIG. 15, the valve member 142 of the valve assembly 140 may be at the first position closing the outlet 114. At the first position, the valve member 142 may close both open upper and lower sides of the valve accommodating case 141.

In this case, one end of the valve shaft 143 may penetrate the valve accommodating case 141 and be inserted in the valve member 142, and the other end of the valve shaft 143 may be inserted in the valve coupling gear 726.

At the first position, the valve coupling gear 726 may be in a state rotated such that the shaft passing groove 7261 opens toward the up direction. Accordingly, upon separating of the grinding device 100 including the grinding case 110 and the valve assembly 140 from the grinding case 110 by a user, the valve shaft 143 may be not interfered.

More specifically, the valve shaft 143 may pass through the shaft passing groove 7261 of the valve coupling gear 726 and the second passing groove 613 of the heater 60 to freely move upward.

As shown in FIG. 16, the valve member 142 of the valve assembly 140 may be at the second position opening the outlet 114. At the second position, the valve member 142 may open both the open upper and lower sides of the valve accommodating case 141.

At the second position, the valve coupling gear 726 may be in a state rotated such that the shaft passing groove 7261 opens toward the side direction. Referring to FIG. 16, both the upper and lower portions of the valve shaft 143 may be restricted by the valve coupling gear 726.

Accordingly, in a case in which a user separates the grinding device 100 including the grinding case 110 and the valve assembly 140 from the housing 10, the valve shaft 143 may be interfered by the valve coupling gear 726.

More specifically, a movement in an upward direction of the valve shaft 143 may be interfered by the shaft passing groove 7261 of the valve coupling gear 726. Accordingly, a movement in the upward direction of the grinding device 100 may be limited to prevent the grinding device 100 from being separated from the housing 10.

Also, because the valve member 142 opens the outlet 114, food waste existing inside the grinding case 110 may be transferred to the transfer duct 83 connected to the valve assembly 140 through the outlet 114. The transferred food waste may be accommodated in the storage case 82 of the storage device 80 and stored.

Hereinafter, an operation of the food waste disposer 1 according to an embodiment of the disclosure are described in view of a control.

In a case in which a user puts food waste into the inside of the grinding device 100 and closes the cover member 30, the controller (not shown) may perform an operation of drying and grinding the food waste accommodated in the grinding device 100. At this time, the heater 60 positioned below the grinding device 100 may operate to heat the grinding device 100.

The controller (not shown) may operate the first driver 71 to rotate the rotating grinder 120. The rotating grinder 120 may grind the food waste accommodated in the grinding case 110 through interworking with the wall grinder 130 fixed to the side wall 111 of the grinding case 110.

Thereafter, the controller (not shown) may operate the second driver 72 by receiving a signal indicating that food waste has been completely grinded, thereby controlling the valve assembly 140. More specifically, the controller (not shown) may control the second driver 72 to rotate the valve member 142 of the valve assembly 140 from the first position to the second position.

The valve member 142 may open the outlet 114 of the grinding case 110, and the controller may control the first driver 71 to rotate the rotating grinder 120 in forward and backward directions. Thereby, the controller may discharge food waste remaining inside the grinding case 110 to the outlet 114.

Thereafter, upon reception of a signal indicating that food waste has been completely discharged after a preset time elapses, the controller (not shown) may control the second driver 72 to rotate the valve member 142 from the second position to the first position. At this time, a user may separate the grinding device 100 from the housing 10 to wash the grinding device 100 or again put food waste into the grinding device 100.

Accordingly, in the food waste disposer 1 according to an embodiment of the disclosure, it may be possible to separate the grinding case 110 and the valve assembly 140 together from the housing 10, thereby sanitarily managing the grinding device 100.

Also, after grinding is completed, food waste may be automatically transferred from the grinding device 100 to the storage device 80 for user convenience.

In addition, by preventing the grinding device 100 from being separated from the housing 10 in a case in which the valve assembly 140 opens the outlet 114 of the grinding case 110, the grinding device 100 may be prevented from being separated from the housing 10 while food waste is transferred to the storage device 80, thereby preventing a breakdown.

Figure 17:
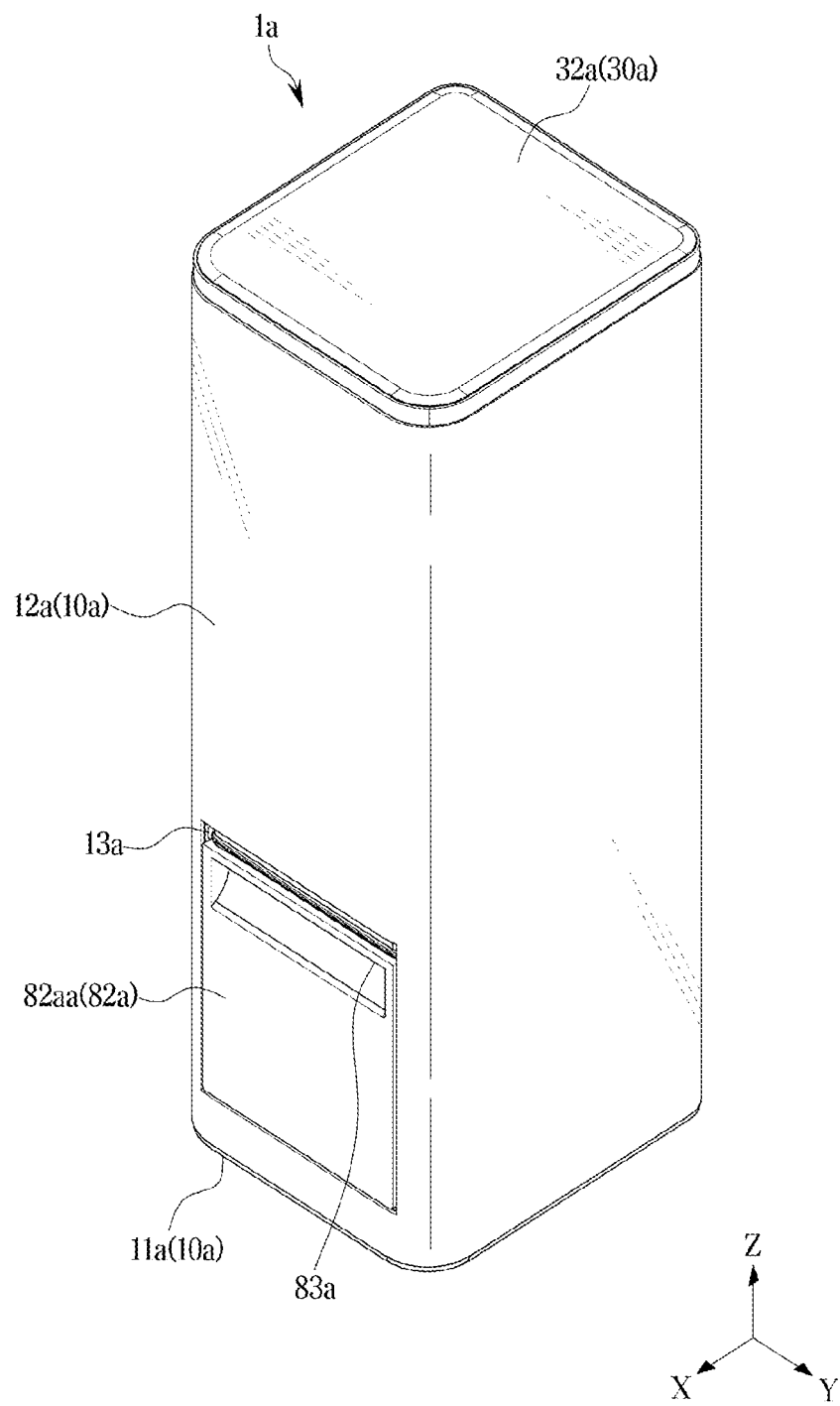
FIG. 17 illustrates a front perspective view of a food waste disposer according to an embodiment of the disclosure.
Figure 18:
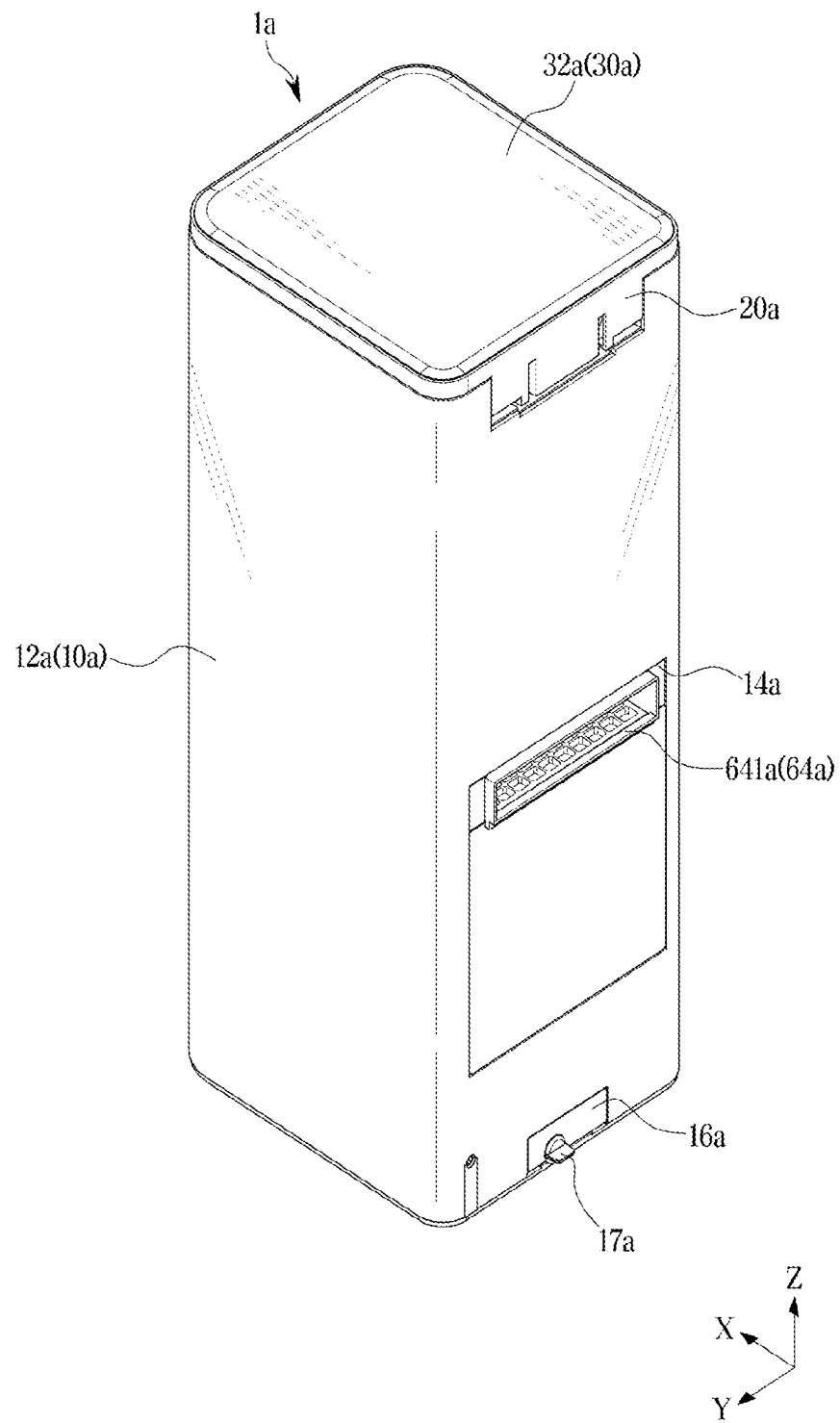
FIG. 18 illustrates a rear perspective view of a food waste disposer according to an embodiment of the disclosure.

FIG. 17 illustrates a front perspective view of a food waste disposer according to an embodiment of the disclosure. FIG. 18 illustrates a rear perspective view of a food waste disposer according to an embodiment of the disclosure.

Referring to FIGS. 17 and 18, a food waste disposer 1a may include a housing 10a and a cover device 30a covering an upper side of the housing 10a.

The housing 10a may form an outer appearance of the food waste disposer 1a. For example, the housing 10a may include a base housing 11a and a side housing 12a mounted on the base housing 11a. The side housing 12a may be detachably coupled with the base housing 11a.

In FIGS. 17 and 18, the side housing 12a is shown to be formed as one body, although not limited thereto.

The side housing 12a may be provided as a plurality of panels that are coupled with each other. In this case, a user or an engineer may easily access various components installed inside the food waste disposer 1a by separating a plurality of housings 10a from each other.

For example, the base housing 11a may form a bottom surface of the food waste disposer 1a, and the side housing 12a may form side surfaces of the food waste disposer 1a. For example, the side housing 12a may include four side walls, although not limited thereto. However, the side housing 12a may have any shape covering various components provided inside the housing 10a.

The food waste disposer 1a may include an accommodating portion 13a formed inside the housing 10a by opening a front side of the housing 10a.

The accommodating portion 13a may accommodate a storage case 82a which are described below. The storage case 82a may be taken out in a front direction or withdrawn in a back direction with respect to the accommodating portion 13a. For example, the storage case 82a may slide along a front-back direction of the food waste disposer 1a to be taken out of the accommodating portion 13a or withdrawn into the accommodating portion 13a.

In a front surface 82aa of the storage case 82a, a grip portion 83a that may be gripped may be provided. For example, the grip portion 83a may be depressed backward from the front surface 82aa of the storage case 82a.

In the front surface 82aa of the storage case 82a, a window may be provided to enable a user to check an amount of food waste existing inside the storage case 82a with his/her naked eye, which is not shown in the drawings. The window may be made of a transparent material.

The food waste disposer 1a may include an exhaust hole 14a provided in a rear side of the housing 10a.

The exhaust hole 14a may communicate with an outlet 641a of a filter assembly 64a which are described below. The exhaust hole 14a may open in the rear side of the housing 10a such that the outlet 641a of the filter assembly 64a communicates with outside of the housing 10a.

The filter assembly 64a may filter exhaust gas and discharge the exhaust gas to the outside of the housing 10a. The filtered gas may be discharged to an external area outside of the housing 10a through the exhaust hole 14a.

The food waste disposer 1a may include a service cover 16a and a cover cap 17a.

The service cover 16a may be provided in the rear side of the housing 10a. The service cover 16a may be detachably coupled with the rear side of the housing 10a.

A cover cap 17a may be inserted in one side of the service cover 16a.

Condensed water generated inside the food waste disposer 1a may be discharged to the outside through the cover cap 17a.

Figure 19:
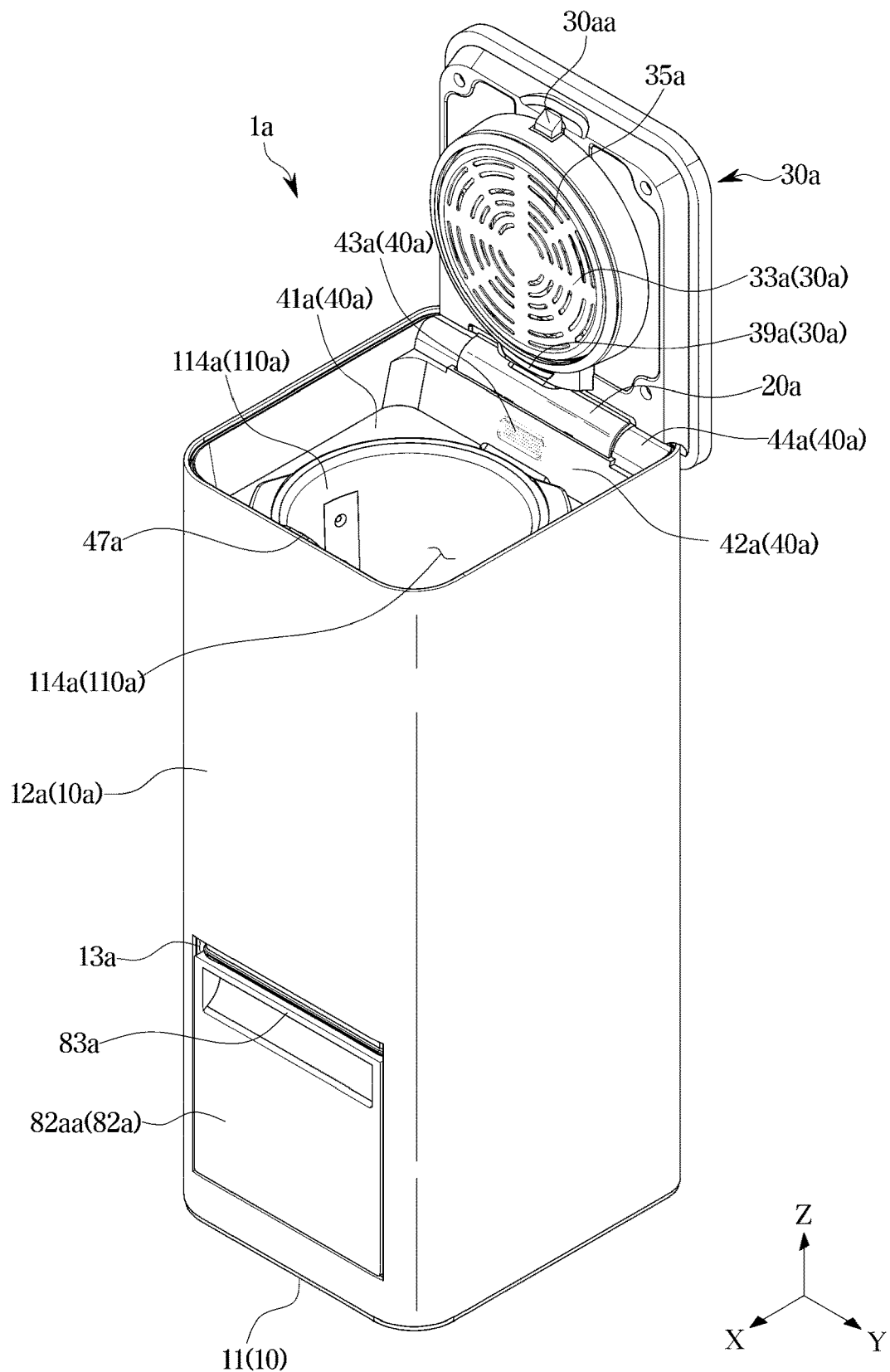
FIG. 19 illustrates an open state of a cover device of a food waste disposer according to an embodiment of the disclosure.
Figure 20:
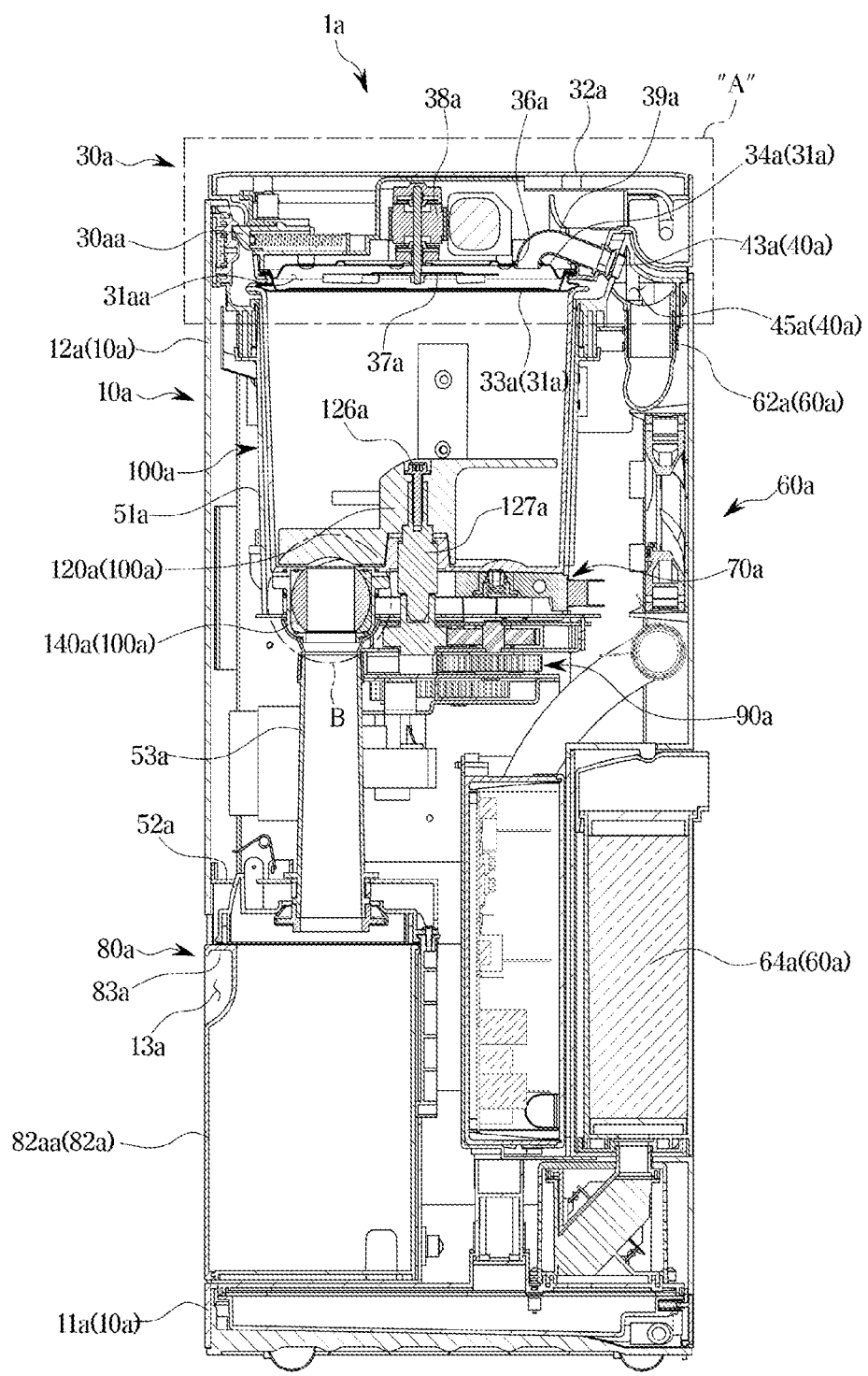
FIG. 20 illustrates a cross-sectional view of a food waste disposer according to an embodiment of the disclosure.
Figure 21:
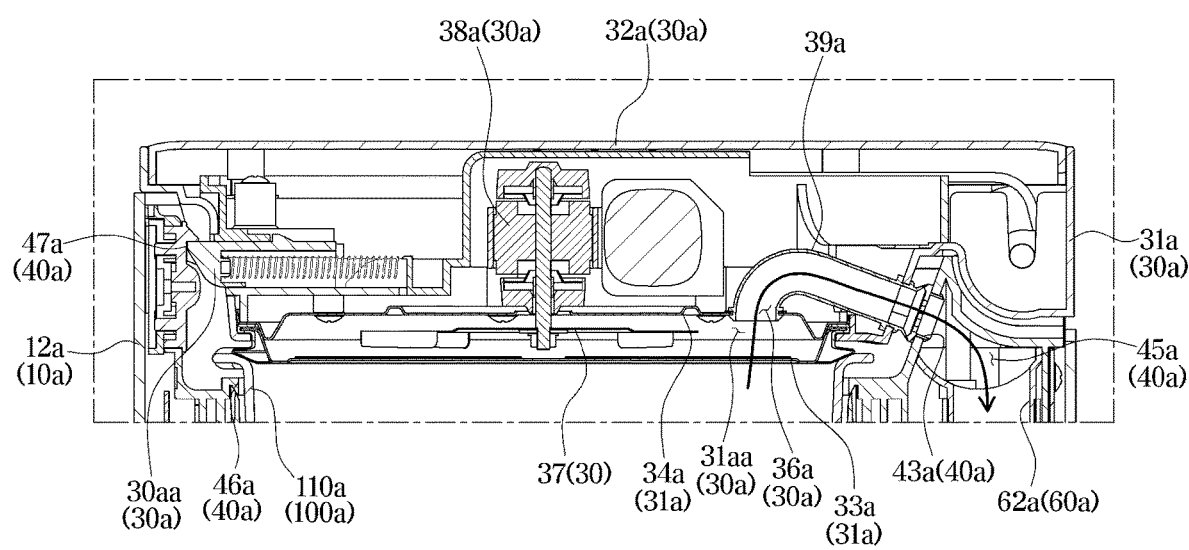
FIG. 21 illustrates an enlarged view of an area A of FIG. 20 according to an embodiment of the disclosure.

FIG. 19 illustrates an open state of a cover device of a food waste disposer according to an embodiment of the disclosure. FIG. 20 illustrates a cross-sectional view of a food waste disposer according to an embodiment of the disclosure. FIG. 21 illustrates an enlarged view of an area A of FIG. 20 according to an embodiment of the disclosure.

Referring to FIGS. 19 to 21, the food waste disposer 1a may include a support frame 40a.

The support frame 40a may support a grinding device 100a inside the housing 10a. The support frame 40a may support an upper portion of the grinding device 100a. The support frame 40a may support an upper circumference surface of the grinding device 100a such that the grinding device 100a is stably fixed inside the housing 10a.

The support frame 40a may include a hinge coupling portion 44a that is coupled with a hinge 20a.

The support frame 40a may include a base portion 41a and an extension portion 42a.

The base portion 41a may form an upper surface of the support frame 40a. The extension portion 42a may extend from the base portion 41a. The extension portion 42a may extend upward to correspond to the side housing 12a. For example, the hinge coupling portion 44a may be formed in one side of the extension portion 42a being adjacent to the hinge 20a.

The base portion 41a may include an insertion hole 46a through which the grinding device 100a is inserted. The grinding device 100a may be inserted into the housing 10a through the insertion hole 46a and supported by the support frame 40a.

The support frame 40a may include an inlet 43a. A plurality of inlets 43a may be provided.

The inlet 43a may communicate with the grinding device 100a. For example, in a case in which the cover device 30a closes the upper portion of the housing 10a, the inlet 43a may communicate with the grinding device 100a through the cover device 30a.

In a case in which the cover device 30a closes the housing 10a, exhaust gas existing inside the grinding device 100a may flow to the cover device 30a, and the exhaust gas entered the cover device 30a may be sucked into the inlet 43a of the support frame 40a through a guide duct 39a which are described below. Details about this are described below.

The support frame 40a may include a connection flow path 45a. The connection flow path 45a may form a portion of a flow path through which exhaust gas flows. For example, the connection flow path 45a may connect the guide duct 39a to an exhaust duct 62a of a deodorization device 60a which are described below.

More specifically, the connection flow path 45a may connect the guide duct 39a to an inlet duct 61a installed at an end of the exhaust duct 62a of the deodorization device 60a.

The support frame 40a may include a latch inserting portion 47a. Because the cover device 30a is rotatable with respect to the support frame 40a, the latch inserting portion 47a may fix the cover device 30a in a case in which the cover device 30a closes the upper portion of the housing 10a.

The food waste disposer 1a may include the grinding device 100a.

The grinding device 100a may accommodate food waste and grind the accommodated food waste. The grinding device 100a may be positioned inside the housing 10a. The grinding device 100a may be detachably installed in the housing 10a.

The grinding device 100a may include a grinding case 110a of which an upper portion opens to form an entrance 114a. A user may put food waste into the grinding device 100a through the entrance 114a of the grinding device 100a.

A grinding device cover 31a of the cover device 30a may cover the entrance 114a. The grinding device cover 31a may have a size corresponding to the entrance 114a. Also, the entrance 114a may have a size corresponding to the insertion hole 46a of the support frame 40a. Details about the grinding device 100a are described below.

The cover device 30a may be rotatably coupled with one side of the support frame 40a to open and close the entrance 114a of the grinding case 110a of the grinding device 100a.

The cover device 30a may include a grinding device cover 31a and a top plate 32a.

The grinding device cover 31a may cover the open upper portion of the grinding device 100a. More specifically, the grinding device cover 31a may cover the entrance 114a of the grinding device 100a. The grinding device cover 31a may cover the upper portion of the grinding case 110a provided to accommodate food waste and grind the food waste.

The top plate 32a may form an upper surface of the food waste disposer 1a.

The grinding device cover 31a may be coupled with the top plate 32a in an up-down direction to form upper and lower surfaces of the cover device 30a.

The grinding device cover 31a may include a lower frame 33a facing the grinding case 110a upon closing of the housing 10a by the cover device 30a, and an upper frame 34a coupled with an upper side of the lower frame 33a. The lower frame 33a may be coupled with the upper frame 34a in the up-down direction to form a preset accommodating space 31aa between the lower frame 33a and the upper frame 34a.

In the preset accommodating space 31aa formed between the lower frame 33a and the upper frame 34a, a circulating fan 37a may be positioned. The circulating fan 37a may uniformly spread inside heat of the grinding case 110. More specifically, a heater 70a provided below the grinding device 100a may heat the grinding device 100a, and accordingly, the inside of the grinding device 100a may be heated.

At this time, food waste located closer to the heater 70a among food waste accommodated inside the grinding device 100a may be more heated. Accordingly, heat may be non-uniformly transferred to the food waste accommodated inside the grinding device 100a.

Accordingly, by installing the circulating fan 37a in the cover device 30a, inside heat of the grinding device 100a may circulate uniformly. In other words, a convection phenomenon may be generated inside the grinding case 110a. Accordingly, inside temperature of the grinding case 110a may become constant throughout the entire area, and drying efficiency of food waste accommodated inside the grinding case 110a may be improved.

The cover device 30a may include a fan driver 38a. The fan driver 38a may drive the circulating fan 37a. The fan driver 38a may be positioned between the top plate 32a and the grinding device cover 31a.

The lower frame 33a may include a first communicating hole 35a. A plurality of first communicating holes 35a may be provided. The upper frame 34a may include a second communicating hole 36a.

Air may be sucked into the cover device 30a from the grinding device 100a through the first communicating hole 35a. The sucked air may flow to the second communicating hole 36a formed in the upper frame 34a.

The cover device 30a may include a guide duct 39a.

The guide duct 39a may rotate together with the cover device 30a according to a rotation of the cover device 30a. For example, in a case in which the cover device 30a closes the upper portion of the housing 10a, one end of the guide duct 39a may face the grinding case 110a together with the grinding device cover 31a.

For example, in a case in which the cover device 30a closes the upper portion of the housing 10a, one end of the guide duct 39a may face downward.

The guide duct 39a may be installed inside the cover device 30a. One end of the guide duct 39a may be fixed to the upper frame 34a. The guide duct 39a may extend in a curved shape. However, the shape of the guide duct 39a is not limited to the curved shape. The guide duct 39a may have any location and shape as long as the guide duct 39a guides exhaust gas existing inside the grinding case 110a to the exhaust duct 62a.

Inside air of the grinding case 110a may flow to the preset accommodating space 31aa of the grinding device cover 31a through the first communicating hole 35a of the lower frame 33a. The air entered the preset accommodating space 31aa of the grinding device cover 31a may flow to one end of the guide duct 39a through the second communicating hole 36a of the upper frame 34a.

The air entered the one end of the guide duct 39a may flow to the connection flow path 45a through the inlet 43a of the support frame 40a. The air entered the connection flow path 45a may flow to the exhaust duct 62a of the deodorization device 60a.

However, inside air of the grinding case 110a may directly flow to the exhaust duct 62a through a structure change.

The cover device 30a may include a latch 30aa.

The latch 30aa may be installed in the grinding device cover 31a of the cover device 30a. The latch 30aa may be elastically movable forward and backward. The latch 30aa may be inserted into the latch inserting portion 47a of the support frame 40a. Thereby, in a case in which the cover device 30a closes the upper portion of the housing 10a, the cover device 30a may be maintained in a closed state by the latch 30aa.

However, the shape of the latch 30aa is not limited to this, and the latch 30aa may be provided in a shape of a simple protrusion to pre-fix a position of the cover device 30a.

Figure 22:
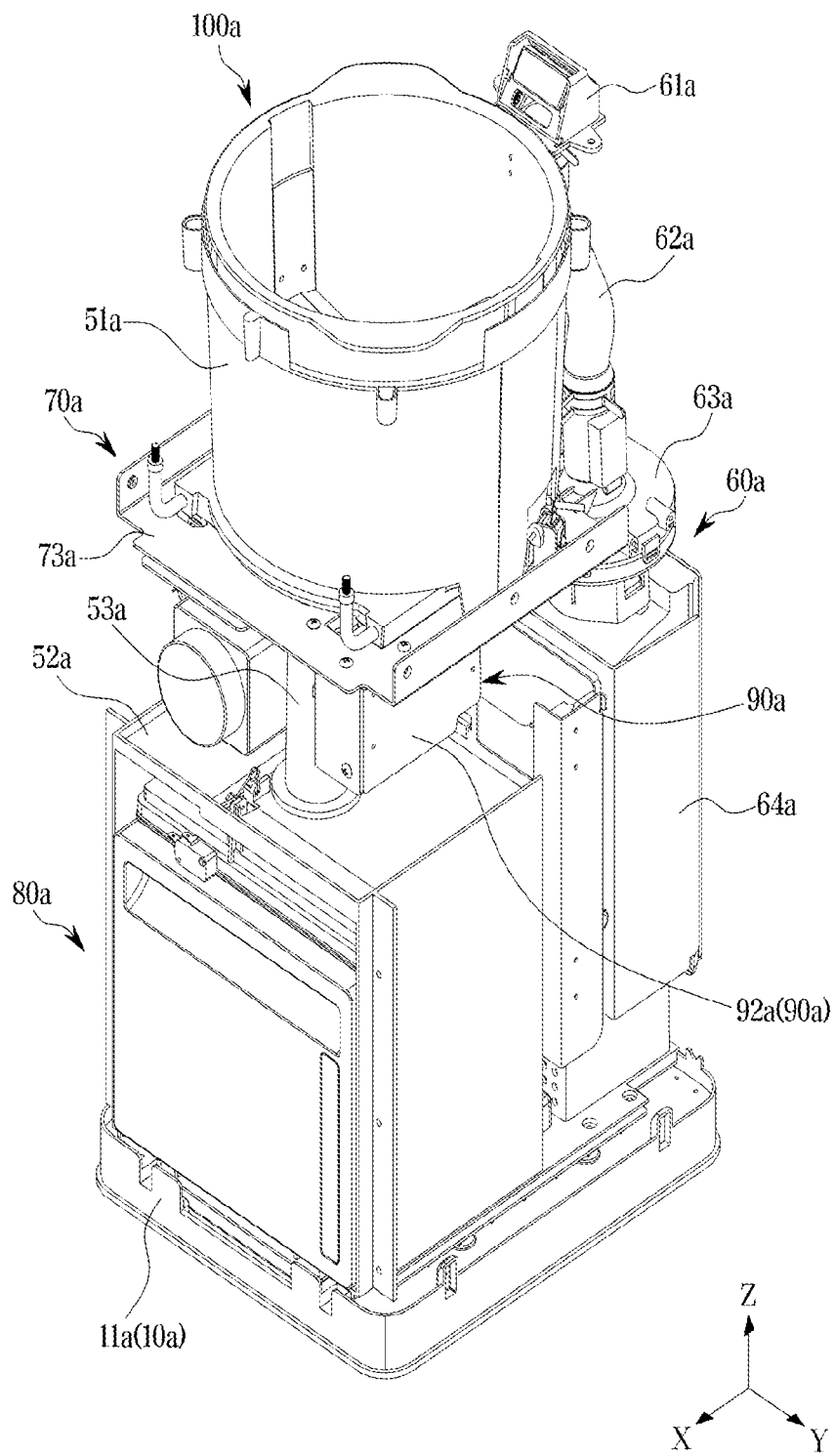
FIG. 22 illustrates a main configuration of a food waste disposer according to an embodiment of the disclosure.
Figure 23:
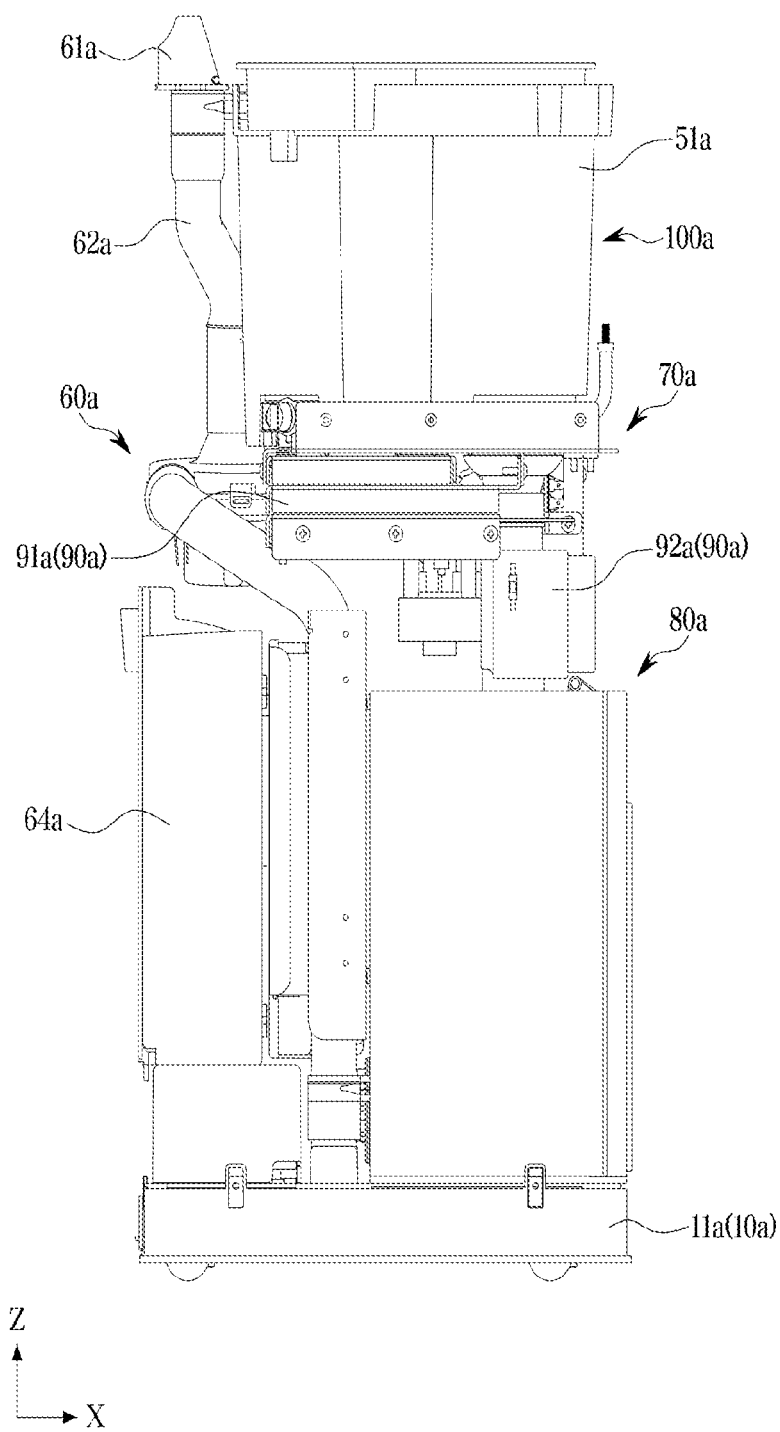
FIG. 23 illustrates a side view of the food waste disposer shown in FIG. 22 according to an embodiment of the disclosure.
Figure 24:
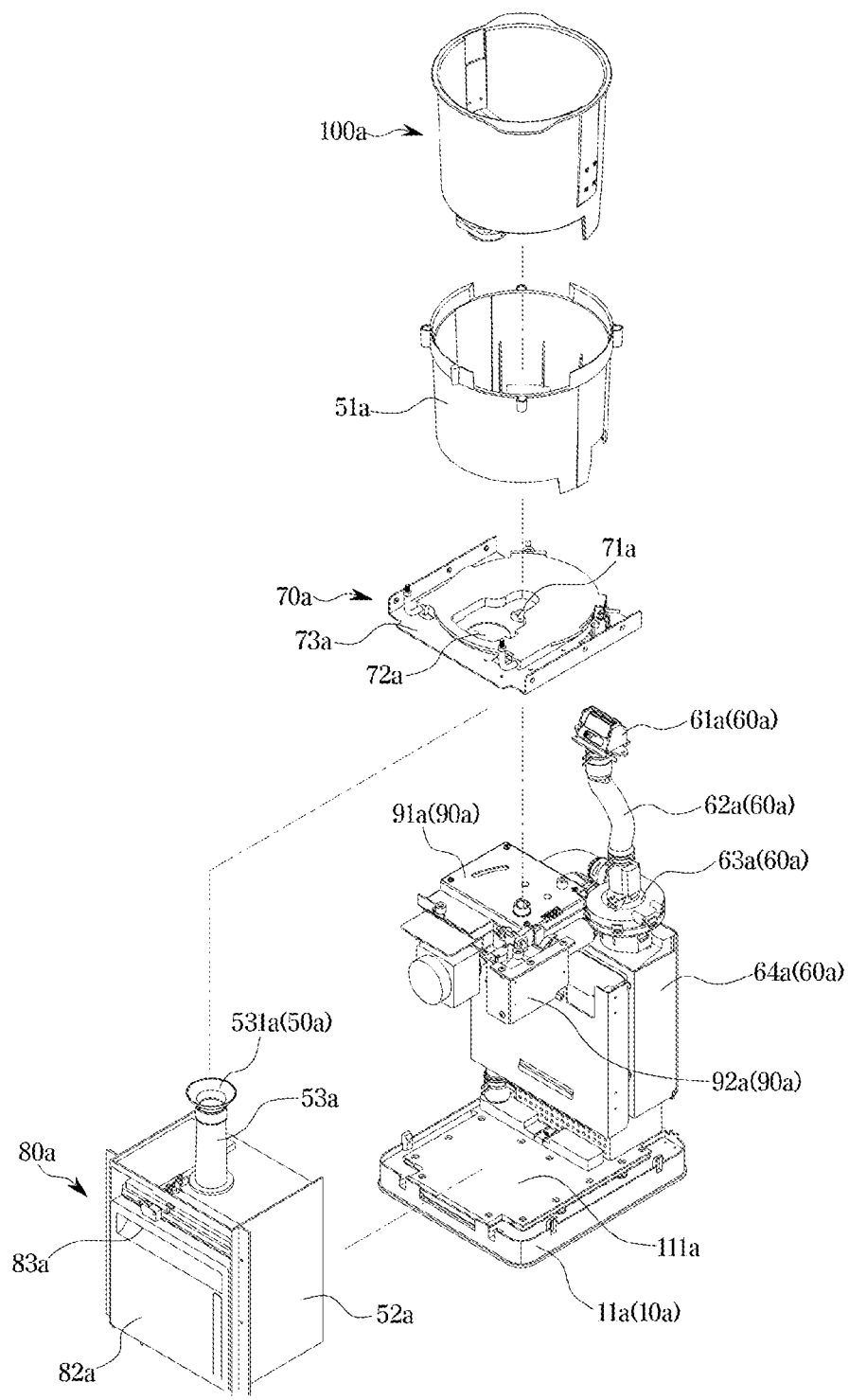
FIG. 24 illustrates an exploded perspective view of the food waste disposer shown in FIG. 22 according to an embodiment of the disclosure.

FIG. 22 illustrates a main configuration of a food waste disposer according to an embodiment of the disclosure. FIG. 23 illustrates side view of the food waste disposer shown in FIG. 22 according to an embodiment of the disclosure. FIG. 24 illustrates an exploded perspective view of the food waste disposer shown in FIG. 22 according to an embodiment of the disclosure.

Referring to FIGS. 22 to 24, the food waste disposer 1a may include the grinding device 100a. The grinding device 100a may be positioned below the cover device 30a described above, and may be opened and closed by the cover device 30a. The cover device 30a may open and close the open upper side of the grinding device 100a.

The grinding device 100a may include the grinding case 110a in which food waste is grinded.

The food waste disposer 1a may include a case frame 51a. The case frame 51a may accommodate the grinding device 100a. The case frame 51a may have a shape corresponding to the grinding device 100a. More specifically, the case frame 51a may be substantially in a shape of a cylinder of which an upper side opens.

The food waste disposer 1a may include the heater 70a.

The heater 70a may be positioned below the grinding device 100a and heat the grinding device 100a. More specifically, the heater 70a may accommodate a heating wire therein. The heater 70a may be positioned below the grinding case 110a.

The heater 70a may be coupled with the case frame 51a. The case frame 51a may be positioned on the heater 70a, and the grinding device 100a may be positioned inside the case frame 51a.

Accordingly, the heater 70a may heat the grinding device 100a from below the grinding device 100a to dry food waste accommodated inside the grinding device 100a. Also, as described above, because the circulating fan 37a is positioned in the cover device 30a, inside heat of the grinding device 100a may circulate in the up-down direction to uniformly dry food waste.

The heater 70a may include an installing frame 73a. The installing frame 73a may be coupled with various fixing frames (not shown) provided inside the housing 10a. Accordingly, the upper portion of the grinding device 100a may be supported by the support frame 40a and the lower portion of the grinding device 100a may be supported by the installing frame 73a of the heater 70a.

The heater 70a may include a shaft penetration portion 71a and a valve penetration portion 72a.

A driving shaft of a first driver 91a may penetrate the shaft penetration portion 71a. The driving shaft of the first driver 91a may be coupled with a grinder shaft 127a (see FIG. 20). The first driver 91a may transfer a driving force to the grinding device 100a via the heater 70a through the driving shaft.

The valve penetration portion 72a may be formed in front of the shaft penetration portion 71a. A valve assembly 140a (see FIG. 25) protruding downward from the grinding device 100a may penetrate the valve penetration portion 72a. The valve assembly 140a protruding downward from the heater 70a through the valve penetration portion 72a may be connected to a second driver 92a which are described below. Details about this are described below.

The food waste disposer 1a may include a driver 90a.

The driver 90a may include the first driver 91a and the second driver 92a.

The first driver 91a may provide power to a rotating grinder 120a of the grinding device 100a such that the rotating grinder 120a rotates inside the grinding case 110a.

The second driver 92a may provide power to a valve member 142a of the valve assembly 140a of the grinding device 100a such that the valve assembly 140a rotates to open and close the outlet 641a. The second driver 92a may be connected to the valve assembly 140a passed through the heater 70a to provide a driving force to the valve member 142a.

However, the second driver 92a may restrict a movement in up direction of the grinding device 100a or enable the grinding device 100a to freely move upward, according to a rotation state of the valve member 142a. Details about this are described below.

A driving shaft of the first driver 91a may be perpendicular to a driving shaft of the second driver 92a. More specifically, the first driver 91a may include a driving shaft extending along a Z direction which is the up-down direction of the food waste disposer 1a. Accordingly, the rotating grinder 120a connected to the first driver 91a may be rotatable on a XY plane of the food waste disposer 1a.

Also, the second driver 92a may include a driving shaft extending along a Y direction which is the left-right direction of the food waste disposer 1a. Accordingly, the valve member 142a connected to the second driver 92a may be rotatable on a XZ plane of the food waste disposer 1a.

Accordingly, the driver 90a of the food waste disposer 1a according to an embodiment of the disclosure may have a plurality of driving shafts that are perpendicular to each other, thereby reducing a volume of the driver 90a inside the food waste disposer 1a.

Accordingly, it may be possible to set a size of the grinding device 100a accommodating food waste, a size of a storage device 80a storing processed food waste, or a size of the deodorization device 60a.

The food waste disposer 1a may include the deodorization device 60a.

The deodorization device 60a may suck bad smell such as smell generated from the grinding device 100a. Such bad smell is also referred to as an exhaust gas. The exhaust gas sucked into the deodorization device 60a may be filtered by the filter assembly 64a and then discharged to the outside of the food waste disposer 1a. More specifically, filtered air may be discharged to the outside through the exhaust hole 14a (see FIG. 18) formed in the housing 10a.

More specifically, an exhaust gas generated from the grinding device 100a may flow to the cover device 30a, and the exhaust gas may flow to the deodorization device 60a because the cover device 30a communicates with the deodorization device 60a.

The deodorization device 60a may include the inlet duct 61a and the exhaust duct 62a. The inlet duct 61a may connect the exhaust duct 62a to the connection flow path 45a of the support frame 40a.

Inside air of the grinding device 100a may pass through the cover device 30a, pass the inlet 43a of the support frame 40a, and flow to the connection flow path 45a. Thereafter, the air may flow to the inlet duct 61a and flow to the exhaust duct 62a.

The deodorization device 60a may include an exhaust fan assembly 63a. The exhaust fan assembly 63a may generate a suction force to cause air to enter the deodorization device 60a.

The deodorization device 60a may include a filter assembly 64a. Air generated from the grinding device 100a may be filtered through the filter assembly 64a. The filter assembly 64a may include an outlet 641a (see FIG. 18). The outlet 641a may communicate with the exhaust hole 14a of the housing 10a.

The food waste disposer 1a may include the storage device 80a.

The storage device 80a may store food waste transferred after dried and grinded by the grinding device 100a. The storage device 80a may be positioned below the grinding device 100a such that grinded food waste is naturally transferred to the storage device 80a by gravity.

The food waste disposer 1a may include an accommodating frame 52a and a transfer duct 53a.

The storage device 80a may be positioned inside the accommodating frame 52a. More specifically, the storage device 80a may be accommodated in the accommodating frame 52a in such a way as to be taken out of the accommodating frame 52a.

The transfer duct 53a may be connected to an upper side of the accommodating frame 52a. The transfer duct 53a may include an inlet 531a formed at an upper end. The inlet 531a may be connected to the valve assembly 140a of the grinding device 100a to communicate with an outlet hole 1121a of the grinding device 100a.

Accordingly, food waste processed by the grinding device 100a may move to the valve assembly 140a through the outlet hole 1121a, and then move to the transfer duct 53a through the inlet 531a of the transfer duct 53a.

The food waste transferred to the transfer duct 53a may move to the storage case 82a through an upper portion of the storage case 82a of the storage device 80a. A portion of an upper side of the storage case 82a may open to communicate with the transfer duct 53a.

The base housing 11a may include a storage device resting portion 111a.

The storage device 80a may be rested on the storage device resting portion 111a. Also, the accommodating frame 52a may be installed on the storage device resting portion 111a.

Accordingly, the storage device 80a may be covered by the base housing 11a and the accommodating frame 52a at the upper surface, the lower surface, and both the side surfaces, except for the front surface 82aa. Accordingly, the storage device 80a may be taken out in the front direction without being fixed on the storage device resting portion 111a.

Figure 25:
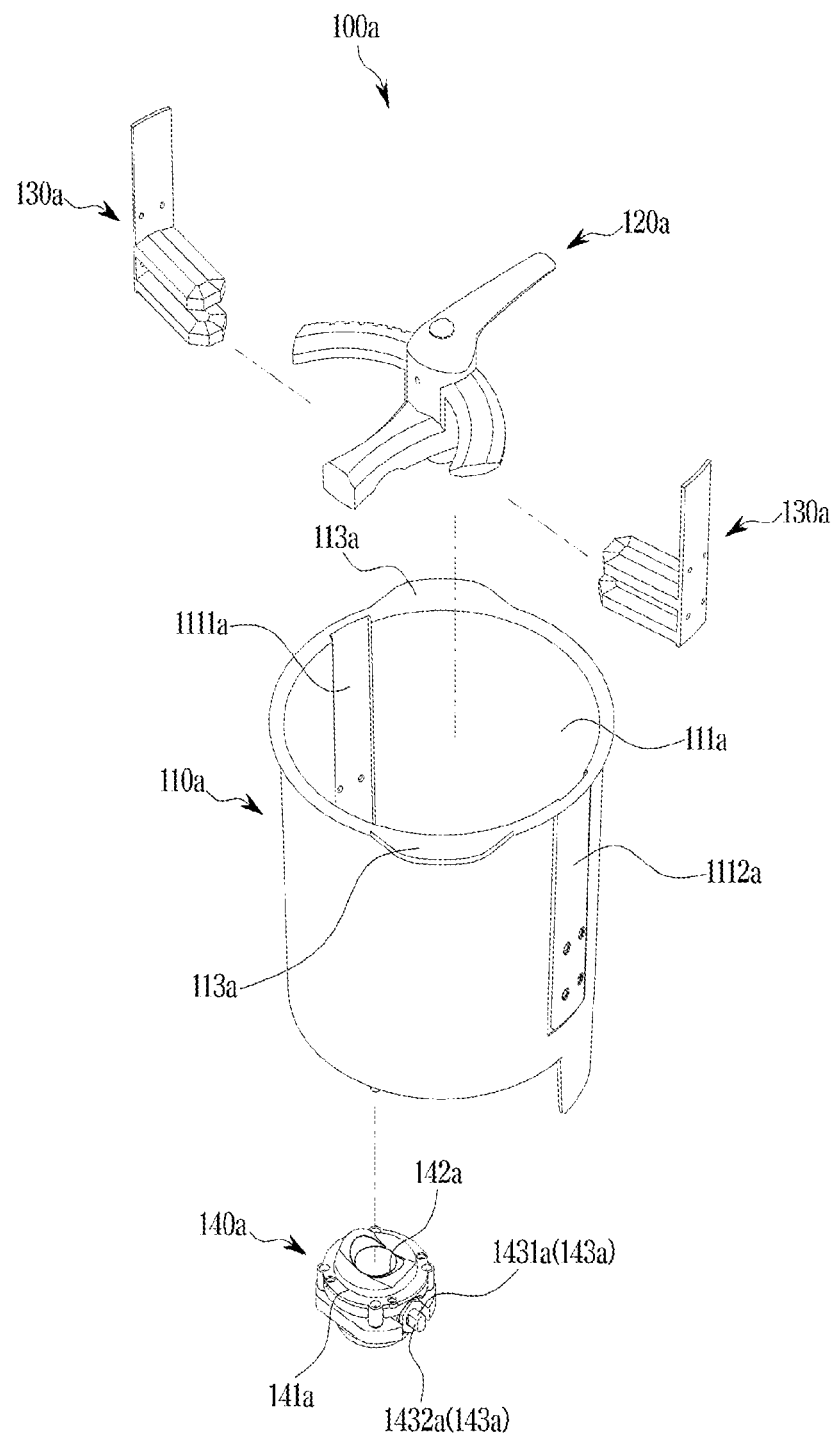
FIG. 25 illustrates an exploded perspective view of a grinding device of the food waste disposer shown in FIG. 24 according to an embodiment of the disclosure.

FIG. 25 illustrates an exploded perspective view of a grinding device of the food waste disposer shown in FIG. 24 according to an embodiment of the disclosure.

The grinding device 100a may be detachably installed inside the housing 10a to grind food waste.

The grinding device 100a may include the grinding case 110a.

The grinding case 110a may accommodate food waste therein. Food waste accommodated inside the grinding case 110a may be heated, dried, stirred, and grinded.

The grinding case 110a may be substantially in a shape of a cylinder of which an upper side opens. The grinding case 110a may include a pair of handles 113a. The pair of handles 113a may be provided at both sides of an upper end of the grinding case 110a. The pair of handles 113a may extend outward from the grinding case 110a to be gripped by a user.

However, the shape of the handles 113a of the grinding case 110a is not limited to this. For example, the handles 113a may be formed by incising a portion of the grinding case 110a such that a user inserts his/her fingers into the handles 113a to grip the grinding case 110a. The handles 113a may have various shapes.

Also, the grinding case 110a may include a protrusion (not shown) protruding upward from a bottom to correspond to a concave shape of the lowest blade of the rotating grinder 120a. The rotating grinder 120a may effectively transfer food waste existing on the bottom without any residue by the protrusion (not shown).

The grinding device 100a may include the rotating grinder 120a and a fixed grinder 130a.

A plurality of fixed grinders 130a may be provided. In the food waste disposer 1a according to an embodiment of the disclosure, two fixed grinders 130a are shown, however, the number of the fixed grinders 130a is not limited to two. Also, a single fixed grinder 130a may be provided.

Each of the rotating grinder 120a and the fixed grinder 130a may include a plurality of blades.

The individual blades of the fixed grinder 130a and the rotating grinder 120a may be spaced a preset distance from each other in the up-down direction, and rotate. Food waste may be grinded by an interaction of the plurality of blades of the fixed grinder 130a and the plurality of blades of the rotating grinder 120a.

The grinding device 100a may include the valve assembly 140a.

The valve assembly 140a may be provided below the grinding case 110a. The valve assembly 140a may protrude downward from the grinding case 110a.

The valve assembly 140a may open and close an outlet hole formed in a bottom plate 112a of the grinding case 110a.

According to opening of the outlet hole by the valve assembly 140a, grinded food waste accommodated inside the grinding case 110a may be transferred to the storage device 80a. The valve assembly 140a may communicate with the transfer duct 53a.

More specifically, a fourth blade 122a rotating at a lowest portion of the rotating grinder 120a which are described below may be provided as a transfer blade, and according to opening of the outlet hole by the valve assembly 140a, the fourth blade 122a may transfer food waste collected on the bottom plate 112a of the grinding case 110a to the outlet hole.

The valve assembly 140a may include a valve accommodating case 141a, a valve member 142a, and a valve shaft 143a.

The valve accommodating case 141a may be coupled with the grinding case 110a.

The valve accommodating case 141a may accommodate the valve member 142a therein. More specifically, the valve accommodating case 141a may accommodate the valve member 142a such that the valve member 142a is rotatable inside the valve accommodating case 141a.

The valve member 142a may be rotatable inside the valve accommodating case 141a. The valve member 142a may open and close the outlet hole of the grinding case 110a by rotating. More specifically, a portion of an inside of the valve member 142a may open, and a portion surrounding the open portion may be closed.

The valve shaft 143a may transfer a driving force to the valve member 142a. One end of the valve shaft 143a may be connected to the valve member 142a, and the other end of the valve shaft 143a may be connected to the second driver 92a. Accordingly, the valve shaft 143a may transfer a driving force to the valve member 142a from the second driver 92a.

The valve shaft 143a may include a first surface 1431a and a second surface 1432a. The first surface 1431a may be substantially perpendicular to the second surface 1432a. The first surface 1431a and the second surface 1432a may have different shapes.

More specifically, the first surface 1431a of the valve shaft 143a may have a narrower width than the second surface 1432a.

Accordingly, in a case in which the valve shaft 143a is connected to the second driver 92a such that the first surface 1431a of the valve shaft 143a is toward the up direction, the valve assembly 140a may be separable in the up direction from the second driver 92a.

More specifically, a portion of a transfer gear (not shown) of the second driver 92a connected to the valve shaft 143a may have an incision having a width corresponding to the first surface 1431a of the valve shaft 143a, and the incision may be toward the up direction. The valve shaft 143a may be accommodated in the incision of the transfer gear.

In a case in which the transfer gear rotates such that a portion of the transfer gear in which the valve shaft 143a is accommodated opens toward the up direction, the valve shaft 143a may be separable from the upper portion of the transfer gear and the valve assembly 140a may be separable from the second driver 92a. Furthermore, the grinding device 100a may be separable from the second driver 92a. At this time, the valve member 142a may close the outlet hole.

Accordingly, a user may more sanitarily manage the food waste disposer 1a by separating the grinding device 100a from the housing 10a and washing the grinding case 110a.

However, in a case in which the valve shaft 143a is connected to the second driver 92a such that the second surface 1432a of the valve shaft 143a is toward the up direction, the valve assembly 140a may be separable from the second driver 92a.

More specifically, because the first surface 1431a is perpendicular to the second surface 1432a, the first surface 1431a may be toward a side direction in a case in which the second surface 1432a is toward the up direction. Accordingly, a portion of the transfer gear (not shown) of the second driver 92a, in which the valve shaft 143a is accommodated, may open toward the side direction. The transfer gear (not shown) and the valve shaft 143a may rotate together. Therefore, in a case in which the first surface 1431a of the valve shaft 143a rotates toward the side direction from the up direction, the open portion of the transfer gear (not shown) may also be toward the side direction.

In this case, in a case in which the valve assembly 140a moves upward, the transfer gear (not shown) of the second driver 92a may interfere with the valve shaft 143a, and accordingly, the valve assembly 140a may be not separated from the second driver 92a. At this time, the valve member 142a may open the outlet hole.

That is, the grinding device 100a may be separable from the second driver 92a in a state in which the valve member 142a closes the outlet hole.

Accordingly, in the food waste disposer 1a according to an embodiment of the disclosure, because the grinding device 100a is separated from the housing 10a in a state in which the valve assembly 140a closes the outlet hole, food waste may be prevented from leaking out through the outlet hole upon separating of the grinding device 100a by a user, and components may be prevented from being damaged upon occurrence of an unexpected situation.

Figure 26:
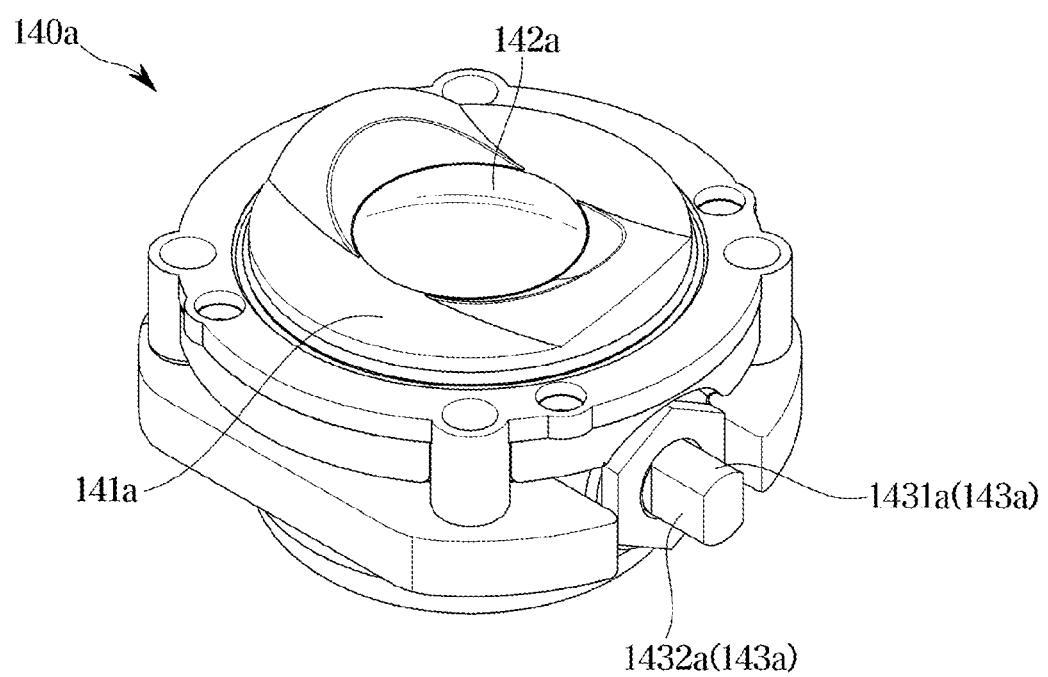
FIG. 26 illustrates a valve assembly of the food waste disposer shown in FIG. 25 according to an embodiment of the disclosure.
Figure 27:
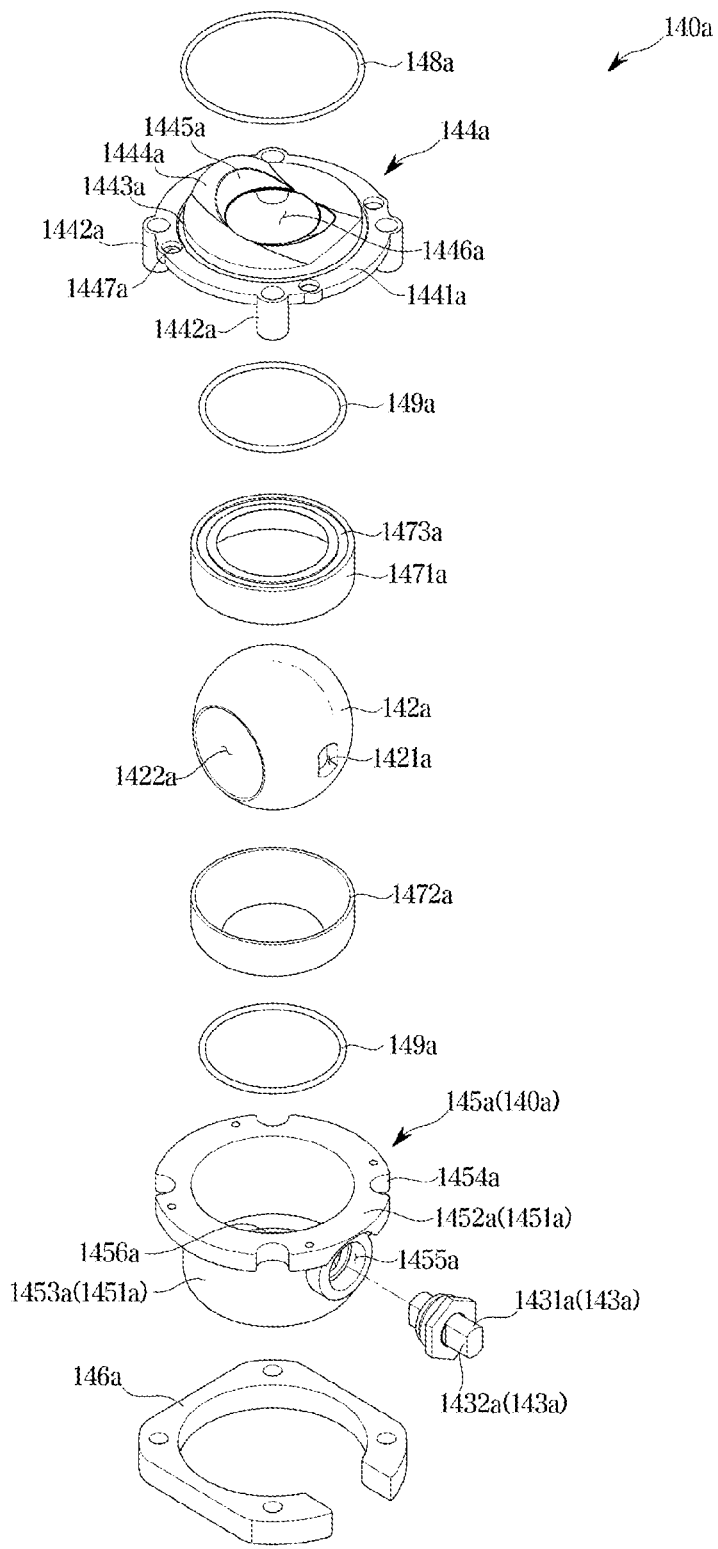
FIG. 27 illustrates an exploded perspective view of the valve assembly of the food waste disposer shown in FIG. 26 according to an embodiment of the disclosure.

FIG. 26 illustrates a valve assembly of the food waste disposer shown in FIG. 25 according to an embodiment of the disclosure. FIG. 27 illustrates an exploded perspective view of the valve assembly of the food waste disposer shown in FIG. 26 according to an embodiment of the disclosure.

Referring to FIGS. 26 and 27, the valve assembly 140a may include the valve accommodating case 141a. The valve accommodating case 141a may include a first case 144a, a second case 145a, and a guard member 146a.

The first case 144a may include a first case body 1441a. The first case body 1441a may form an outer appearance of the first case 144a.

The first case 144a may include a case coupling portion 1442a.

The case coupling portion 1442a may be formed at an edge of the first case body 1441a. The case coupling portion 1442a may be in a shape of a boss. The case coupling portion 1442a may be coupled with the guard member 146a by passing a separate coupling member through a boss passing portion 1454a of the second case 145a and inserting the separate coupling member into the case coupling portion 1442a.

Also, the case coupling portion 1442a may be coupled with the grinding case 110a.

Accordingly, by coupling the coupling member from below the guard member 146a by the case coupling portion 1442a, the valve accommodating case 141a of the valve assembly 140a may be fixed to the grinding case 110a.

In FIG. 27, four case coupling portions 1442a are shown, however, the number of the case coupling portions 1442a is not limited to four.

The first case 144a may include a coupling hole 1447a. The coupling hole 1447a may couple the first case 144a with the second case 145a. In the second case 145a, a coupling portion may be formed to correspond to a location of the coupling hole 1447a formed in the first case 144a. A coupling member may be inserted into the coupling hole 1447a of the first case 144a and the coupling portion of the second case 145a to couple the first case 144a with the second case 145a.

The first case 144a may include an accommodating groove 1443a.

The accommodating groove 1443a may be formed in an upper surface of the first case body 1441a. The accommodating groove 1443a may be depressed inward from the upper surface of the first case body 1441a. The accommodating groove 1443a may accommodate a case sealing member 148a which are described below.

The first case 144a may include a case protrusion 1444a. The case protrusion 1444a may protrude upward from the upper surface of the first case body 1441a. The case protrusion 1444a may have a shape corresponding to the protrusion (not shown) formed on the bottom of the grinding case 110a.

The first case 144a may include an inlet hole 1446a opening to transfer grinded food waste from the grinding case 110a to the transfer duct 53a. The inlet hole 1446a may be formed in a center portion of the first case body 1441a.

The case protrusion 1444a may include an inclined surface 1445a inclined toward the inlet hole 1446a. Accordingly, food waste grinded by the rotating grinder 120a may be easily discharged to the inlet hole 1446a along the inclined surface 1445a.

The second case 145a may include a second case body 1451a.

The second case body 1451a may include an upper flange 1452a and a valve accommodating portion 1453a.

The upper flange 1452a may form an upper surface of the second case body 1451a.

The boss passing portion 1454a may be formed in an edge of the upper flange 1452a. The boss passing portion 1454a may enable the case coupling portion 1442a of the first case 144a to penetrate the upper flange 1452a downward. The case coupling portion 1442a of the first case 144a, penetrated the boss passing portion 1454a, may be coupled with the guard member 146a by a coupling member.

The valve accommodating portion 1453a may extend downward from the upper flange 1452a. The valve accommodating portion 1453a may form an accommodating space for accommodating the valve member 142a therein.

The valve accommodating portion 1453a may include a shaft insertion portion 1455a. The valve shaft 143a may be inserted into inside of the valve accommodating portion 1453a through the shaft insertion portion 1455a and coupled with a shaft insertion hole 1421a of the valve member 142a.

In a lower portion of the valve accommodating portion 1453a, an outlet hole 1456a may be formed such that food waste entered the inlet hole 1446a of the first case 144a is discharged to the inlet 531a of the transfer duct 53a through the outlet hole 1456a.

The guard member 146a may be positioned on an outer surface of the second case 145a along a circumference surface of the valve accommodating portion 1453a. The guard member 146a may open at a portion into which the valve shaft 143a is inserted such that the valve shaft 143a is coupled with the second case 145a. That is, the guard member 146a may cover a side portion of the valve shaft 143a at the same height as the valve shaft 143a.

Therefore, in a case in which a user takes the grinding device 100a out of the housing 10a, the user may have difficulties in separating the valve shaft 143a from the second case 145a. Because the guard member 146a covers the side portion of the valve shaft 143a, the user may have difficulties in separating the valve shaft 143a from the second case 145a by using a tool such as a wrench.

The valve assembly 140a may include a case sealing member 148a.

The case sealing member 148a may be positioned in the accommodating groove 1443a of the first case 144a to seal an assembly allowance between the valve assembly 140a and the grinding case 110a. Through the case sealing member 148a, a phenomenon in which food waste existing inside the grinding case 110a is stuck between the valve assembly 140a and the grinding case 110a may be prevented. Accordingly, the grinding device 100a may be more cleanly maintained.

The valve assembly 140a may include a first valve sealing member 1471a and a second valve sealing member 1472a that are accommodated inside the valve accommodating case 141a.

The first valve sealing member 1471a may be in contact with a portion of an upper portion of the valve member 142a. The second valve sealing member 1472a may be in contact with a portion of a lower portion of the valve member 142a.

The first valve sealing member 1471a and the second valve sealing member 1472a may include a Teflon material.

The first valve sealing member 1471a and the second valve sealing member 1472a may be made of a material having certain elasticity. Because the valve member 142a is rotatable inside the valve accommodating case 141a, the first valve sealing member 1471a and the second valve sealing member 1472a may be made of a material capable of reducing friction with the valve member 142a, and may be in contact with the valve member 142a.

The first valve sealing member 1471a and the second valve sealing member 1472a may prevent food waste accommodated inside the grinding case 110a and water contained in the food waste from leaking out of the valve member 142a. In other words, the first valve sealing member 1471a and the second valve sealing member 1472a may prevent water existing inside the grinding case 110a from leaking out through the valve assembly 140a in a state in which the valve member 142a closes the outlet hole of the grinding case 110a.

Accordingly, the first valve sealing member 1471a and the second valve sealing member 1472a may be in contact with the valve member 142a with a certain level of force or more.

The valve assembly 140a may include a support member 149a.

The support member 149a may be positioned above the first valve sealing member 1471a and below the second valve sealing member 1472a. The support member 149a may be provided as an O-ring.

As time elapses, a force of the first valve sealing member 1471a and the second valve sealing member 1472a pressing the valve member 142a may be reduced. As the valve member 142a rotates in a state in which the valve member 142a is in contact with the first valve sealing member 1471a and the second valve sealing member 1472a, the first valve sealing member 1471a and the second valve sealing member 1472a may be worn or damaged by friction.

The support member 149a may support the first valve sealing member 1471a and the second valve sealing member 1472a such that a force of the first valve sealing member 1471a pressing the valve member 142a and a force of the second valve sealing member 1472a pressing the valve member 142a are maintained at a certain level or more.

That is, the support member 149a positioned on the first valve sealing member 1471a may press the first valve sealing member 1471a toward the valve member 142a, and the support member 149a positioned beneath the second valve sealing member 1472a may press the second valve sealing member 1472a toward the valve member 142a.

Figure 28:
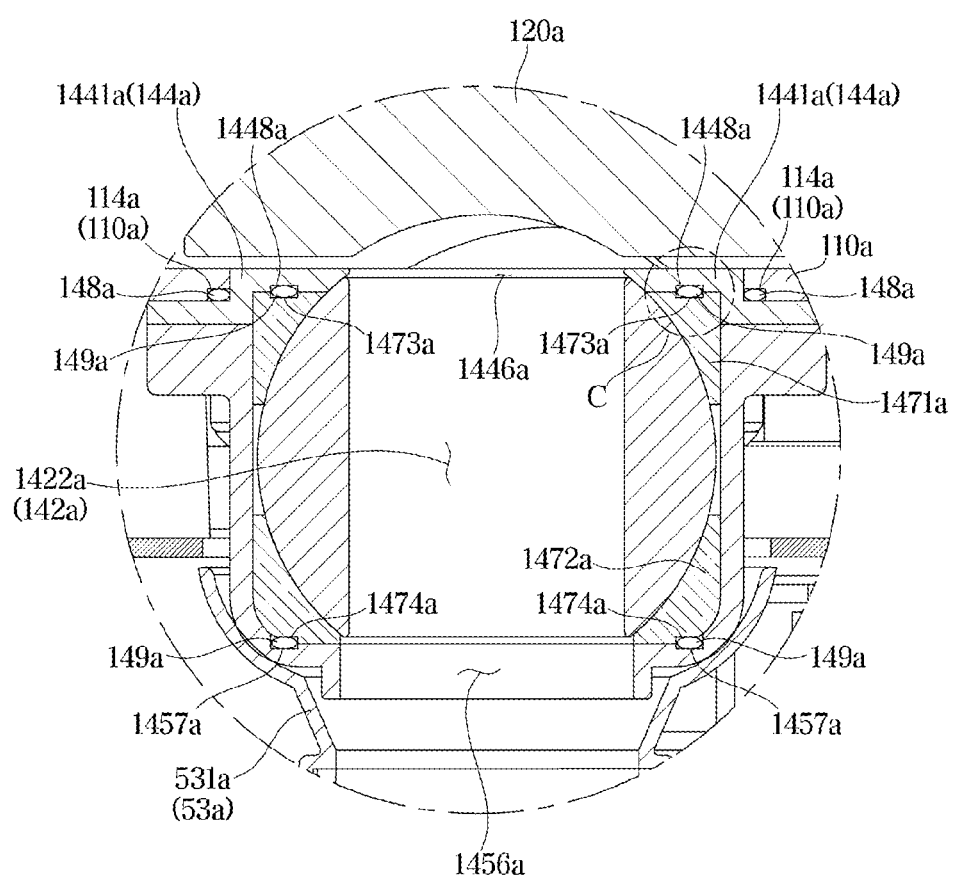
FIG. 28 illustrates an enlarged view of an area B of FIG. 20 according to an embodiment of the disclosure.
Figure 29:
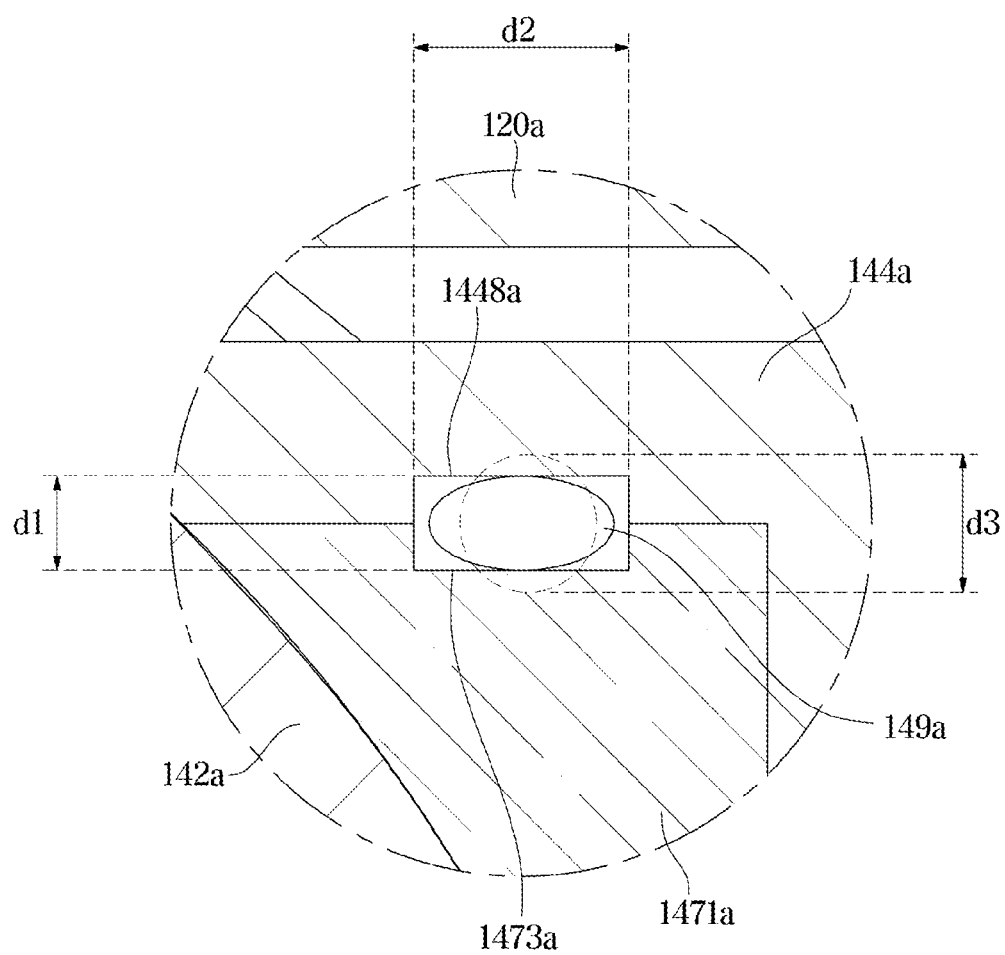
FIG. 29 illustrates an enlarged view of an area C of FIG. 28 according to an embodiment of the disclosure.

FIG. 28 illustrates an enlarged view of an area B of FIG. 20 according to an embodiment of the disclosure. FIG. 29 illustrates an enlarged view of an area C of FIG. 28 according to an embodiment of the disclosure.

Referring to FIG. 28, the valve assembly 140a may be coupled with a lower portion of the grinding case 110a.

The case sealing member 148a may be positioned between the grinding case 110a and the first case 144a. More specifically, the grinding case 110a may include a sealing member accommodating portion formed by depressing a portion of the bottom plate 112a of the grinding case 110a. Accordingly, the case sealing member 148a may be accommodated in the sealing member accommodating portion. The case sealing member 148a may be provided as an O-ring having elasticity. Accordingly, the case sealing member 148a may be depressed between the grinding case 110a and the first case 144a and deformed from an original circular cross section to an oval cross section.

A support member 149a may be positioned between the first valve sealing member 1471a and the first case 144a. The support member 149a may be accommodated in a first support accommodating groove 1473a formed in an upper surface of the first valve sealing member 1471a. Also, the support member 149a may be accommodated in a first support accommodating portion 1448a formed in an inner surface of the first case 144a. That is, a lower portion of the support member 149a may be accommodated in the first support accommodating groove 1473a of the first valve sealing member 1471a, and an upper portion of the support member 149a may be accommodated in the first support accommodating portion 1448a of the first case 144a.

The support member 149a may be positioned between the second valve sealing member 1472a and the second case 145a. The support member 149a may be accommodated in a second support accommodating groove 1474a formed in a lower surface of the second valve sealing member 1472a. Also, the support member 149a may be accommodated in a second support accommodating portion 1457a formed in an inner surface of the second case 145a. That is, an upper portion of the support member 149a may be accommodated in the second support accommodating groove 1474a of the second valve sealing member 1472a, and a lower portion of the support member 149a may be accommodated in the second support accommodating portion 1457a of the second case 145a.

An elastic restoring force of the support member 149a and a compression force applied to the valve member 142a according to a diameter of a cross section of the support member 149a and a size of a space in which the support member 149a is accommodated are described with reference to FIGS. 28 to 29.

The support member 149a may be made of a material having elasticity, and the upper and lower portions of the support member 149a may be pressed by the first support accommodating portion 1448a and the first support accommodating groove 1473a. The support member 149a may have a circular cross section as shown in a dotted line, before being pressed. However, in a case in which the support member 149a is pressed by the first case 144a and the first valve sealing member 1471*a*, the support member 149*a* may be deformed to have an oval cross section as shown in a solid line.

Before the support member 149*a* is pressed, a diameter d3 of a cross section of the support member 149*a* may be 1.8 mm or more. Preferably, the diameter d3 of the cross section of the support member 149*a* may be about 1.9 mm.

A sum d1 of a length in up-down direction of the first support accommodating portion 1448*a* of the first case 144*a* and a length in up-down direction of the first support accommodating groove 1473*a* of the first valve sealing member 1471*a* may be about 1.3 mm.

Also, a length d2 in left-right direction of the first support accommodating portion 1448*a* of the first case 144*a* may be about 3 mm. A length d2 in left-right direction of the first support accommodating groove 1473*a* of the first valve sealing member 1471*a* may also be about 3 mm. The length d2 in the left-right direction may be interpreted to be a length in a horizontal direction based on the floor.

Accordingly, the diameter d3 of the cross section of the support member 149*a* may be 1.9 mm, and, in a case in which the support member 149*a* is pressed by the first case 144*a* and the first valve sealing member 1471*a*, the support member 149*a* may be pressed by the sum d1 of the length in up-down direction of the first support accommodating portion 1448*a* of the first case 144*a* and the length in up-down direction of the first support accommodating groove 1473*a* of the first valve sealing member 1471*a*.

That is, a length in up-down direction of a portion overlapping with a counterpart over an accommodating space of the support member 149*a* in the support member 149*a* may be about 0.5 mm. Preferably, the length in up-down direction of the portion overlapping with the counterpart over the accommodating space of the support member 149*a* in the support member 149*a* may be about 0.6 mm. That is, an amount of deformation of the support member 149*a* may be 0.6 mm.

An elastic restoring force of the support member 149*a* may be calculated by Equation (1), below.

$$\frac{F}{\pi * D * d * E} = 1.25 * \delta^{\frac{2}{3}} + 50 * \delta^6 \qquad \text{Equation (1)}$$

In Equation (1), F is elastic restoring force of the support member 149*a*. D is length between a center of a cross section of the support member 149*a* and a center of the 180 degrees opposite cross section of the support member 149*a*. The expression, d is the diameter of the cross section of the support member 149*a*. E: Young's modulus (1.5 Mpa). The expression δ is amount of deformation of the support member 149*a* (diameter of the cross section of the support member 149*a*–diameter of the cross section of the support member 149*a* after being pressed)/diameter of the cross section of the support member 149*a*.

A length between the center of the cross section of the support member 149*a* and the center of the 180 degrees opposite cross section of the support member 149*a* may be about 36 mm.

Because a shape of the support member 149*a* is deformed by the above-described overlapping portion, the support member 149*a* may apply an elastic restoring force to the first valve sealing member 1471*a*.

Because the first case 144*a* is made of a harder material than the first valve sealing member 1471*a*, the elastic restoring force of the support member 149*a* may be applied to the first valve sealing member 1471*a*. Because the first valve sealing member 1471*a* is also made of a material having certain elasticity, the first valve sealing member 1471*a* may press the valve member 142*a* by pressing by the support member 149*a*.

The elastic restoring force of the support member 149*a*, calculated by the above-described Equation, may be about 20.68 kgf or more.

Finally, a compression force applied to the valve member 142*a* may be 10 kgf or more.

Accordingly, the diameter d3 of the cross section of the support member 149*a* according to another embodiment of the disclosure and the length d1 in up-down direction of the space in which the support member 149*a* is accommodated are not limited to the above-mentioned values, as long as the δ value is preferably 0.33.

In a case of the valve assembly according to another embodiment of the disclosure, by positioning the support member 149*a* such that a contact force between the valve member 142*a* and the valve sealing member is maintained, air tightness between the valve member 142*a* and the valve sealing member may be raised.

Accordingly, in the food waste disposer according to the disclosure, it may be possible to separate the grinding case and the valve assembly together from the housing, thereby sanitarily managing the grinding device.

The food waste disposer according to the disclosure may automatically transfer, after grinding is completed, food waste from the grinding device to the storage device for user convenience.

Because the food waste disposer according to the disclosure prevents the grinding device from being separated from the housing in a case in which the valve assembly opens the outlet of the grinding case, the grinding device may be prevented from being separated from the housing while food waste is transferred to the storage device, thereby preventing a breakdown.

Although a few embodiments of the disclosure have been shown and described, it would be appreciated by those skilled in the art that changes may be made in these embodiments without departing from the principles and spirit of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A food waste disposer comprising:
   a housing;
   a grinding device positioned inside the housing and configured to grind food waste; and
   a storage device positioned below the grinding device and configured to store the grinded food waste; and
   an accommodating frame fixed inside of the housing and accommodating the grinding device;
   wherein the grinding device comprises:
   a grinding case with an interior providing a surface for grinding the food waste, and including an outlet opening to transfer the food waste to the storage device; and
   one or more of a fixed grinder and a rotating grinder, wherein the fixed grinder and the rotating grinder comprise one or more blades proportioned to grind food waste against the interior of the grinding case; and
   a valve assembly positioned below the grinding case and comprising a valve to open and close the outlet, and a valve shaft blocking upward movement of the grinding device when the valve is in a position opening the outlet, wherein, when the valve is in a position closing the outlet, the valve shaft does not block upward movement of the grinding device, which can be separated from the accommodating frame by lifting the grinding device away from the accommodating frame.

2. The food waste disposer of claim 1, wherein the valve assembly comprises:
 a valve accommodating case protruding downward from the grinding case, and wherein the valve opens and closes by rotating within the valve accommodating case.

3. The food waste disposer of claim 2, wherein the valve comprises:
 a body; and
 a communicating portion provided inside the body and configured to open the outlet of the grinding case.

4. The food waste disposer of claim 3, further comprising:
 a first driver configured to provide power to a rotating grinder installed inside the grinding case; and
 a second driver configured to rotate the valve.

5. The food waste disposer of claim 4, wherein one end of the valve shaft is inserted in the valve and another end of the valve shaft is connected to the second driver.

6. The food waste disposer of claim 5, wherein the second driver comprises:
 a motor;
 a valve transfer gear configured to transfer power generated by the motor; and
 a valve coupling gear engaged with the valve transfer gear, wherein the valve shaft is inserted in the valve coupling gear.

7. The food waste disposer of claim 6, wherein the valve is rotatable between a first position at which the body closes the outlet and a second position at which the communicating portion opens the outlet.

8. The food waste disposer of claim 7, wherein the valve coupling gear comprises a shaft passing groove opening upward such that the valve shaft is separable from the valve coupling gear at the first position of the valve.

9. The food waste disposer of claim 8, wherein the valve coupling gear rotates together with the valve to interfere with a movement in an up direction of the valve shaft such that the shaft passing groove of the valve coupling gear opens in a side direction at the second position of the valve.

10. The food waste disposer of claim 2, further comprising:
 a valve sealing member accommodated inside the valve accommodating case and being in contact with the valve, the valve sealing member configured to prevent a foreign material from leaking out of the valve; and
 a support member accommodated between the valve accommodating case and the valve sealing member and configured to press the valve sealing member against the valve.

11. The food waste disposer of claim 10, wherein the support member is accommodated in a support accommodating portion of the valve accommodating case and a support accommodating groove of the valve sealing member, the support member being deformable.

12. The food waste disposer of claim 11, wherein a cross section of the support member is 36 mm.

13. The food waste disposer of claim 11, wherein the support member is deformable with an elastic restoring force of at least 20.68 kgf.

14. The food waste disposer of claim 1, further comprising:
 an upper frame provided in an upper portion of the housing; and
 a bottom frame positioned below the upper frame and supporting the grinding device; and
 wherein the accommodating frame is fixed between the upper frame and the bottom frame and configured to accommodate the grinding case.

15. The food waste disposer of claim 14, further comprising a heater provided inside the accommodating frame,
 wherein the heater is configured to heat the grinding case from below the grinding case, and
 wherein the heater includes a heating wire accommodating frame in which a heating wire is positioned.

16. The food waste disposer of claim 15,
 wherein the heating wire accommodating frame includes a passing groove such that the valve shaft is movable upward in a case in which the grinding case and the valve assembly are separated from the housing.

17. The food waste disposer of claim 14, wherein the bottom frame comprises an incision portion formed in a front portion of the bottom frame such that the valve assembly protruding downward from the grinding case is accommodated in the incision portion.

18. The food waste disposer of claim 1, further comprising:
 a cover including a grinding device cover, the cover positioned above the grinding device on a top side of the housing, wherein the cover is configured to open and close the grinding device.

19. The food waste disposer of claim 1, further comprising:
 a deodorizer configured to filter air from the grinding device and discharge the filtered air through an exhaust hole formed on the housing.

20. The food waste disposer of claim 1, further comprising:
 a transfer duct configured to transfer the grinded food waste from the grinding device to the storage device,
 wherein the valve assembly is connected to the transfer duct.

* * * * *